United States Patent
Nagase et al.

(10) Patent No.: US 9,565,393 B2
(45) Date of Patent: Feb. 7, 2017

(54) COMMUNICATION TERMINAL, TELECONFERENCE SYSTEM, AND RECORDING MEDIUM

(71) Applicants: Tatsuya Nagase, Kanagawa (JP); Yoshinaga Kato, Kanagawa (JP)

(72) Inventors: Tatsuya Nagase, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 350 days.

(21) Appl. No.: 14/054,981

(22) Filed: Oct. 16, 2013

(65) Prior Publication Data

US 2014/0118476 A1    May 1, 2014

(30) Foreign Application Priority Data

Oct. 29, 2012    (JP) ................... 2012-237581

(51) Int. Cl.
*H04N 7/15* (2006.01)
*H04N 7/14* (2006.01)

(52) U.S. Cl.
CPC ............ *H04N 7/15* (2013.01); *H04N 7/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0012048 A1* | 1/2002 | Yamagishi | ......... | H04N 1/00307 348/207.99 |
| 2005/0136897 A1* | 6/2005 | Praveenkumar | ........ | H04L 29/06 455/414.1 |
| 2008/0031161 A1* | 2/2008 | Osthus | .............. | H04L 29/06027 370/261 |
| 2008/0144501 A1* | 6/2008 | Nagy | .................... | H04W 28/22 370/235 |
| 2008/0225112 A1* | 9/2008 | Kim | ....................... | H04N 7/147 348/14.13 |
| 2008/0267282 A1* | 10/2008 | Kalipatnapu | ....... | H04L 12/1822 375/240.01 |

(Continued)

FOREIGN PATENT DOCUMENTS

JP    H09-289636    11/1997
JP    2001-231019    8/2001

(Continued)

OTHER PUBLICATIONS

Japanese Office Action issued Aug. 30, 2016 in corresponding Application No. 2012-237581 (3 pages).

*Primary Examiner* — Joseph J Nguyen
(74) *Attorney, Agent, or Firm* — Oblon, McClelland, Maier & Neustadt, L.L.P.

(57) ABSTRACT

Disclosed is a communication terminal transmitting and receiving audio data and at least one of image data obtained by imaging a subject and display data of a shared screen between the communication terminal and one or more other communication terminals via a relay device. The communication terminal includes a detector configured to detect a predetermined event in which transmission of the image data is not required while imaging the subject is continuously executed, and a stopper configured to stop imaging the subject and stop transmitting the image data in response to the detection of the predetermined event.

13 Claims, 15 Drawing Sheets

(56) References Cited

U.S. PATENT DOCUMENTS

| | | | | |
|---|---|---|---|---|
| 2009/0244257 A1* | 10/2009 | MacDonald | ............ | H04N 7/142 |
| | | | | 348/14.09 |
| 2010/0013923 A1* | 1/2010 | Yakura | ............... | H04N 5/23206 |
| | | | | 348/143 |
| 2010/0194847 A1* | 8/2010 | Halavy | .................. | H04N 7/152 |
| | | | | 348/14.09 |
| 2011/0205331 A1* | 8/2011 | Kato | ...................... | H04N 7/147 |
| | | | | 348/14.08 |
| 2013/0038676 A1 | 2/2013 | Tanaka et al. | | |
| 2013/0242033 A1 | 9/2013 | Kato et al. | | |

FOREIGN PATENT DOCUMENTS

| | | |
|---|---|---|
| JP | 2006-270987 | 10/2006 |
| JP | 2011-077838 | 4/2011 |
| JP | 2011-254453 | 12/2011 |
| JP | 2012-134941 | 7/2012 |
| JP | 2013-228830 A | 11/2013 |
| WO | WO 2013/162055 A1 | 10/2013 |

\* cited by examiner

FIG.6

| DATA NAME | TRANSMISSION STATUS |
|---|---|
| VIDEO DATA | TRUE |
| DISPLAY DATA | TRUE |

FIG.7

| ARRANGEMENT INFORMATION | AREA 1 | AREA 2 | AREA 3 | AREA 4 |
|---|---|---|---|---|
| SHARED_MULTI | DISPLAY DATA | VIDEO DATA 1 | VIDEO DATA 2 | ... |
| SHARED_ONLY | DISPLAY DATA | | | |
| VIEW_MULTI | VIDEO DATA 1 | VIDEO DATA 2 | VIDEO DATA 3 | ... |
| VIEW_ONLY | VIDEO DATA 1 | | | |

FIG.10

| RECEIVING SOURCE TERMINAL ID | DATA NAME | RECEPTION STATUS |
|---|---|---|
| 1111 | VIDEO DATA 1 | TRUE |
| 1111 | DISPLAY DATA 1 | TRUE |
| 2222 | VIDEO DATA 2 | TRUE |
| 2222 | DISPLAY DATA 2 | FALSE |
| 3333 | VIDEO DATA 3 | TRUE |
| 3333 | DISPLAY DATA 3 | FALSE |

FIG.11

| TRANSMITTING DESTINATION TERMINAL ID | DATA NAME | TRANSMISSION STATUS |
|---|---|---|
| 1111 | VIDEO DATA 1 | TRUE |
| 1111 | VIDEO DATA 2 | TRUE |
| 1111 | VIDEO DATA 3 | TRUE |
| 1111 | DISPLAY DATA 1 | TRUE |
| 2222 | VIDEO DATA 1 | FALSE |
| 2222 | VIDEO DATA 2 | FALSE |
| 2222 | VIDEO DATA 3 | FALSE |
| 2222 | DISPLAY DATA 2 | TRUE |
| 3333 | VIDEO DATA 1 | TRUE |
| 3333 | VIDEO DATA 2 | TRUE |
| 3333 | VIDEO DATA 3 | TRUE |
| 3333 | DISPLAY DATA 3 | FALSE |

COMMUNICATION TERMINAL, TELECONFERENCE SYSTEM, AND RECORDING MEDIUM

BACKGROUND OF THE INVENTION

1. Field of the Invention

The disclosures discussed herein relate to a teleconferencing system capable of holding a conference between remote locations via a network, a communication terminal employed in the teleconferencing system, and a non-transitory computer-readable recording medium storing a program executed by the communication terminal.

2. Description of the Related Art

Teleconferencing system have increasingly become popular along with the widespread use and the progress in speed of Internet access. The teleconferencing system enables conference members to hold the conference by teleconferencing between remote locations, which eliminates the members' extra labor and time for gathering in one location.

The teleconferencing system includes a communication terminal disposed in a conference room at one end where one group of members of a conference gather, and a communication terminal disposed in a conference room at the other end where the other group of members of the conference gather. Each of the communication terminals is configured to capture images of the conference room including the members of the conference, receive audio inputs such as utterances, convert the captured images and received audio inputs into digital image data and audio data, respectively, and transmit the converted digital image data and digital audio data to the communication terminal at the other end. The communication terminal at the other end is configured to receive the image data to display on a display of the communication terminal while receiving the audio data to output sound from a speaker of the communication terminal, which implements holding a virtual conference similar to the actual conference.

In above teleconferencing system, there is disclosed a technology in which display data of documents used in the conference are transmitted together with the image data and the audio data by utilizing an external input unit from a communication terminal at one end to a communication terminal at the other end, thereby sharing the same documents between the two remotely located groups of members of the conference (e.g., Patent Document 1 and Patent Document 2).

RELATED ART DOCUMENTS

Patent Document

Patent Document 1: Japanese Laid-open Patent Publication No. 2011-254453

Patent Document 2: Japanese Patent Application No. 2012-099413

However, in the teleconferencing system utilizing the above-described technology, even though only shared display data are transmitted, a camera serving as an imaging unit not utilized in the conference is activated such that the image data are acquired and transmitted, which results in consuming an excess amount of electric energy.

SUMMARY OF THE INVENTION

According to one aspect of the embodiment, there is provided a communication terminal transmitting and receiving audio data and at least one of image data obtained by imaging a subject and display data of a shared screen between the communication terminal and one or more other communication terminals via a relay device. The communication terminal includes a detector configured to detect a predetermined event in which transmission of the image data is not required while imaging the subject is continuously executed; and a stopper configured to stop imaging the subject and stop transmitting the image data in response to the detection of the predetermined event.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

BRIEF DESCRIPTION OF THE DRAWINGS

FIG. 6 is a diagram illustrating an example of a transmission management table retained by the communication terminal;

FIG. 7 is a diagram illustrating a relationship between arrangement information and video data or display data allocated to each area;

FIG. 10 is a diagram illustrating an example of a reception management table retained by the relay device;

FIG. 11 is a diagram illustrating an example of a transmission management table retained by the communication terminal;

DESCRIPTION OF THE PREFERRED EMBODIMENTS

Figure 1:
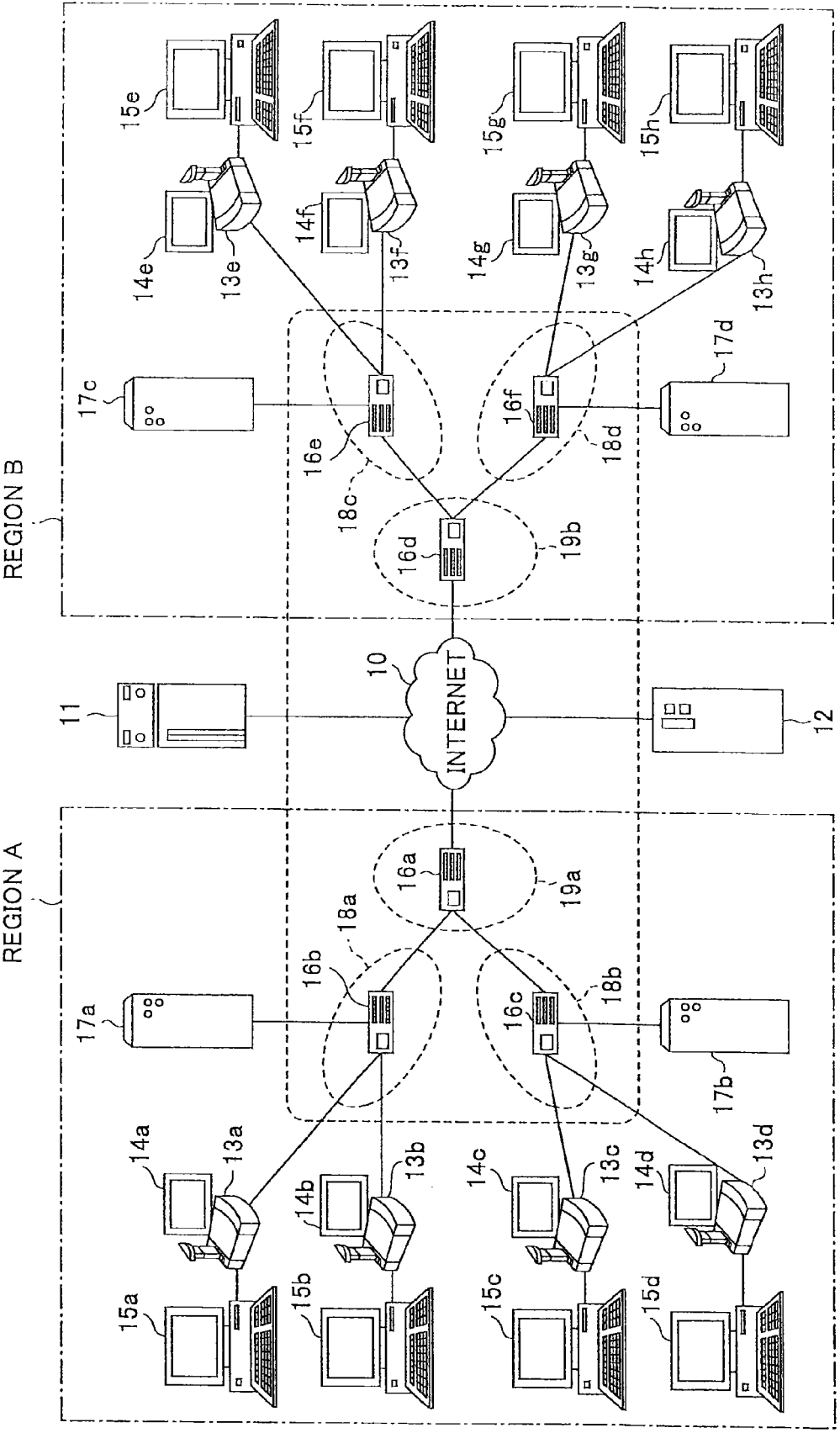
FIG. 1 is a schematic configuration diagram illustrating a teleconferencing system of one embodiment.

FIG. 1 is a schematic configuration diagram illustrating a teleconferencing system of an embodiment. The teleconferencing system is capable of displaying images, such as documents utilized in a conference, faces and facial expressions of two or more groups of members desired to attend a conference who are situated at geographically remote places from one another so as to allow the remotely situated groups to communicate with one another while monitoring the displayed images. Thus, the teleconferencing system is not limited to the example illustrated above, and may be any of a television (TV) or video conferencing system, a videoconference call system, and the like insofar as the system is capable of allowing remotely situated groups to communicate with one another.

The teleconferencing system illustrated in FIG. 1 is configured to allow two geographically remote regions A and B to hold a conference. The region A may be Japan, and the region B may be the United States of America (USA). In this example, the teleconferencing system allows two regions A and B to hold a conference; however, the teleconferencing system may allow three or more regions to hold a conference.

The teleconferencing system is configured to connect between the regions A and B such that the regions A and B are able to communicate with each other. A communications system utilized in the teleconferencing system may employ an appropriate communications protocol such as transmission control protocol (TCP)/Internet protocol (IP).

The teleconferencing system illustrated in FIG. 1 is configured to include a management server 11 connected to Internet 10, a program providing server 12, communication terminals 13a to 13h, and displays 14a to 14h respectively connected to the communication terminals 13a to 13h. The teleconferencing system illustrated in FIG. 1 is configured to further include external input units 15a to 15h respectively connected to the communication terminals 13a to 13h. The teleconferencing system is configured to further include routers 16a to 16f configured to respectively connect the communication terminals 13a to 13h and the Internet 10, and relay devices 17a to 17d respectively connected to the routers 16b, 16c, 16e, and 16d.

The region A includes the communication terminals 13a to 13d, the displays 14a to 14d, the external input units 15a to 15d, the routers 16a to 16c, and the relay devices 17a and 17b. The communication terminals 13a and 13b, the router 16b, and the relay device 17a are connected via a local area network (LAN) 18a such that the communication terminals 13a and 13b, the router 16b, and the relay device 17a are able to communicate with one another. The communication terminals 13c and 13d, the router 16c, and the relay device 17b are connected via a LAN 18b such that the communication terminals 13c and 13d, the router 16c, and the relay device 17b are able to communicate with one another. The LANs 18a and 18b are configured to be connected to the Internet 10 via a dedicated line 19a including the router 16a.

The region B includes the communication terminals 13e to 13h, the displays 14e to 14h, the external input units 15e to 15h, the routers 16d to 16f, and the relay devices 17c and 17d. The communication terminals 13e and 13f, the router 16e, and the relay device 17c are connected via a LAN 18c such that the communication terminals 13e and 13f, the router 16e, and the relay device 17c are able to communicate with one another. The communication terminals 13g and 13h, the router 16f, and the relay device 17d are connected via a LAN 18d such that the communication terminals 13g and 13h, the router 16f, and the relay device 17d are able to communicate with one another. The LANs 18c and 18d are configured to be connected to the Internet 10 via a dedicated line 19b including the router 16d.

In this embodiment, a communication network is composed of the Internet 10, the LANs 18a to 18d, and the dedicated lines 19a and 19b. For example, in the region A, the LAN 18a is constructed within Tokyo Office, the LAN 18b is constructed within Osaka Office. Likewise, in the region B, the LAN 18c is constructed within New York Office, the LAN 18d is constructed within Washington, D.C. Office.

In the following description, a "communication terminal 13", a "display 14", an "external input unit 15", a "router 16", a "relay device 17", a "LAN 18", and a "dedicated line 19" represent any one of the communication terminals, any one of the displays, any one of the external input units, any one of the routers, any one of the relay devices, any one of the LANs, and any one of the dedicated lines, respectively.

The program providing server 12 is configured to include a storage unit storing programs supplied to the communication terminals 13a to 13h, the management server 11, and the relay devices 17a to 17d. The program providing server 12 is configured to retrieve programs in response to respective requests from the communication terminals 13a to 13h, the management server 11, and the relay devices 17a to 17d, and transmit the retrieved programs to the appropriate components. The programs are installed in the communication terminals 13a to 13h, the management server 11, and the relay devices 17a to 17d to implement the later-described various functions.

The management server 11 is configured to receive the program from the program providing server 12, and install the received program to manage communications between the two regions A and B. The management server 11 is configured to store various tables and use these tables for managing the communications. One of the various tables may be a terminal authentication management table. The terminal authentication management table may, for example, be configured to manage the communication terminals 13 by associating a password to each of terminal identifiers (i.e., terminal IDs) assigned to the communication terminals 13. The terminal IDs and the associated passwords are utilized for allowing the communication terminals 13 (i.e., members of the conference) to log into the teleconferencing system in order to hold the teleconference.

Other tables include a communication-terminal management table, a relay device management table, an address list management table, and a session management table. The communication terminal management table is configured to manage the communication terminals 13 by associating terminal IDs of the communication terminals 13 with operating statuses of the communication terminals 13, login request information received date and time at which login request information such as the terminal IDs and their corresponding passwords transmitted from the communication terminals 13 is received, and IP addresses of the communication terminals 13. Examples of the operating status include "online", "offline", and "failed".

The relay device management table is configured to manage the relay devices 17 by associating device IDs of the relay devices 17 with operating statuses of the relay devices 17, status information receiving date and time at which status information of the relay devices 17 is received, IP addresses of the relay devices 17, and maximum transmission rates of the relay devices 17. The address list management table is configured to manage address lists by associating the terminal IDs of the communication terminals 13 requesting initiation of the conference with all the terminal IDs registered as candidates for communication terminals 13 serving as destinations to which data are transmitted.

The session management table is configured to manage sessions for selecting the relay devices 17 by associating the device IDs of the relay devices, the terminal IDs of request source communication terminals 13, and the terminal IDs of destination communication terminals 13 with each of selecting session IDs for use in execution of the sessions for selecting the relay devices 17. The session management table is configured to further manage the sessions by associating a delay time when image data are received in the destination communication terminals 13 and date and time at which the delay time information is received in the destination communication terminals 13 with each of the selecting session IDs.

Each of the communication terminals 13 is configured to transmit to another communication terminal 13 captured imaged data, display data shared on screens such as conference documents supplied from the external input units 15, and supplied audio data. The communication terminal 13 is configured to receive the image data, and the display data from the other communication terminal 13 and display the received image data and display data on the display 14 while receiving audio data from the other communication terminal 13 and displaying the received audio data on the display 14.

The image data at least include facial images of attendees at the conference that depict respective facial expressions. Note that the image data may be static or dynamic image data. Note also that the image data may include both the dynamic and the static image data. The image data and audio data may be subject to streaming delivery so as to be regenerated simultaneously with being received.

The image data may be transmitted after the image data are compression coded; however, a video coding system in compliance with various standards may be employed as the compression coding technology for compression coding the image data. One of the standards may, for example, include H.264, and H264/AV or H264/SVC may be employed. In H.264/SVC, data are divided into plural channels to be coded and the coded divided data are transmitted to a communication partner. Hence, the communication partner may be able to decode the received data by combining the plural channels based on a status of a network or the capacity of the regenerating apparatus, and acquiring the decoded data as appropriate data without having any deficiency.

Note that the communication terminal 13 is configured to receive the image data, the display data, and the audio data from the other communication terminal 13; however, the number of the other terminals 13 is not limited to one. When the number of the other terminals 13 is not limited to one, the communication terminal 13 is configured to receive the image data or the audio data from plural other communication terminals 13. The communication terminal 13 is configured to divide a screen into one or more areas based on arrangement information set in advance for displaying plural images on the display 14 utilizing the plural image data, and dispose the plural images in the respective areas of the screen. These images include video of respective faces or the like of the attendees, and images of the conference documents.

The display 14 is configured to display the image data transmitted to or received from the connected communication terminal(s) 13 based on the above-described arrangement information, and display the display data of the conference documents used in the conference. The display 14 may be any of devices insofar as these devices are capable of displaying the above data, and examples of the display 14 may, for example, include a liquid crystal display (LCD), an organic electroluminescence (EL) display, and the like.

The external input unit 15 is configured to capture images of the conference documents and the like displayed on a display provided with the external input unit 15 at regular time intervals, and transmit image data of the captured images as display data to the communication terminal(s) 13 connected to the external input unit 15 at regular time intervals.

The display data are utilized for displaying the conference documents, and the like to be shared on the screens of the plural communication terminals 13. Examples of the display data include document data, tabular data, image data, and the like used in word-processing software, spreadsheet software, presentation software, and the like. The display data may also be static or dynamic image data. The display data may include both the static and dynamic image data.

The router 16 is configured to select an optimal route of transmitting image data, display data, and audio data. Hence, the router 16 is configured to maintain a routing table in which IP addresses of the transmission source router 16 and communication terminal 13 are associated with IP addresses of the transmission destination router 16 and communication terminal 13. The router 16 is configured to include a storage part, and store and maintain the routing table in the storage part. In order to uniquely identify the communication terminal 13 or the router 16, a media access control (MAC) address, a terminal ID, a terminal name, a router name, or the like may be used alone or in combination with the IP address. The IP address is not limited to the Internet Protocol version 4 (IPv4) and may employ the Internet Protocol version 6 (IPv6).

The relay device 17 is configured to relay transmission of image data, and the like between the communication terminals 13. Where to transmit the image data, and the like, or whether to stop the transmission of the image data, and the like is determined based on management information maintained by the relay device 17. The teleconferencing system illustrated in FIG. 1 includes four relay devices 17a to 17d; however, the communication terminals 13 determine which one of the relay devices 17a to 17d is employed, as described later.

Although not illustrated in FIG. 1, the teleconferencing system may further include a maintenance system. The maintenance system serves as a computer configured to maintain, manage, and service the management server 11, the program providing server 12, the communication terminals 13, and at least one of the relay devices 17a and 17b. The maintenance system may be disposed domestically and internationally insofar as the maintenance system is connected to the Internet 10, and be able to perform maintenance such as maintaining, managing, and servicing the above-describes servers or devices remotely via the Internet 10. Alternatively, the maintenance system may be able to perform maintenance such as managing model numbers, serial numbers, sale destinations, maintenance inspection histories, and failure history of the above-described servers and devices without having intervention of the communication network including the Internet 10.

Figure 2:
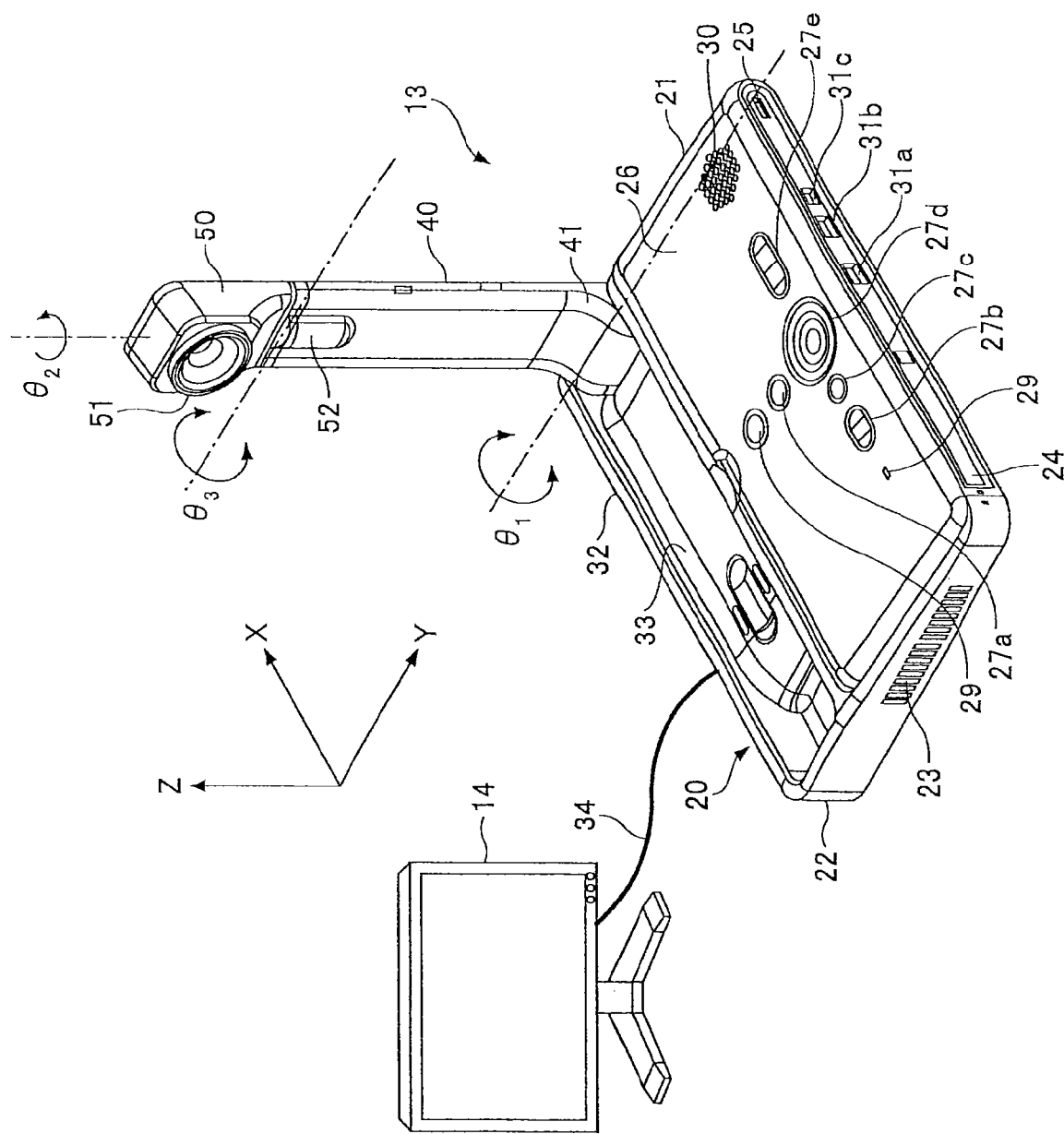
FIG. 2 is an external view illustrating a communication terminal of one embodiment.
Figure 3:
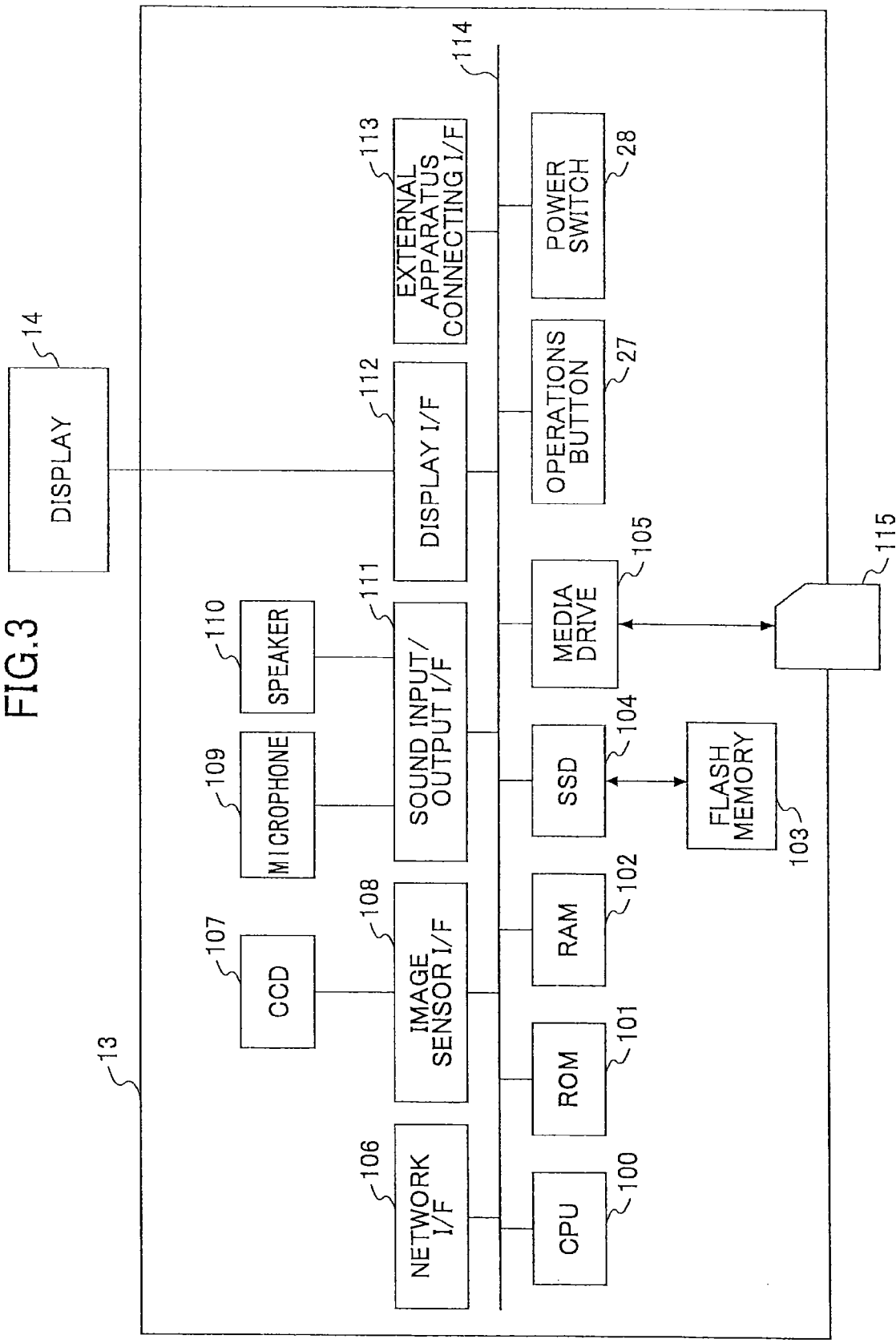
FIG. 3 is a hardware configuration diagram illustrating the communication terminal of one embodiment.

To illustrate the communication terminal 13 further in detail, FIGS. 2 and 3 are referred to. FIG. 2 is an external view illustrating an example of the communication terminal 13, and FIG. 3 is a hardware configuration diagram illustrating the communication terminal 13. As illustrated in FIG. 2, an x-axis direction represents a longitudinal direction of the communication terminal 13, a y-axis direction represents a direction orthogonal to the x-axis direction within a horizontal plane, and a z-axis direction represents a direction orthogonal to the x-axis direction and the y-axis direction (i.e., a vertical direction).

The communication terminal 13 includes a housing 20, an arm 40, and a camera housing 50. The housing 20 includes an air intake surface formed of not illustrated plural air intake holes in a front wall surface of the housing 20, and an air exhaust surface 23 formed of plural air exhaust holes in a rear wall surface 22 of the housing 20. Hence, external air is taken in from a not illustrated air intake surface by driving a cooling fan disposed inside the housing 20 to cool inside the housing 20, and the air is, after having cooled inside the housing 20, exhausted from the air exhaust surface 23.

A sound collecting hole 25 is formed in a right wall surface 24 of the housing 20 such that voice, sound, noise, and the like are capable of being collected by a built-in microphone implemented inside the housing 20 via the sound collecting hole 25. In addition, an operations panel 26 is formed on the right wall surface 24 side of the housing 20. The operations panel 26 includes plural operations buttons 271 to 27e, a power supply switch 28, an alarm lamp 29, and a sound output surface 30 formed of plural sound output holes via which sound is output from a built-in speaker implemented inside the housing 20. Further, connecting ports 31a to 31c for connecting the communication terminal 13 via a cable to an external apparatus are disposed in the right wall surface 24 of the housing 20.

A resting part 33 for storing the arm 40 and the camera housing 50 is formed as a recess part in the left wall surface 32 of the housing 20. Further, not illustrated connecting ports 31a to 31c are disposed in the right wall surface 32 of the housing 20 for connecting the communication terminal 13 to an external apparatus using a cable.

The arm 40 is attached to the housing 20 via a torque hinge 41 such that the arm 40 is able to pivot in a vertical direction (i.e., upward and downward directions) with respect to the housing 20 within a range of a tilt angle $\theta 1$ of approximately 135 degrees. Note that the tilt angle allows the inclination of the arm 40 to change in the vertical direction. The tilt angle $\theta 1$ is approximately 90 degrees in the example illustrated in FIG. 2.

The camera housing 50 includes a built-in camera 51 as an imaging unit that is configured to image documents, and scenery inside the conference room in addition to attendees of the conference as imaging subjects. The camera housing 50 also includes a torque hinge 52 via which the camera housing 50 is attached to the arm 40. In FIG. 2, the camera housing 50 is configured to pivot within a range of a pan angle $\theta 2$ of minus 180 (−180) to plus 180 (+180) degrees and also pivot within a range of tilt angle $\theta 3$ of −45 to +45 degrees when a condition of the arm 40 illustrated in FIG. 2 is 0 degrees with respect to the arm 40. Note that the pan angle $\theta 2$ allows the direction of the camera 51 to change in the horizontal direction.

As illustrated in FIG. 3, the communication terminal 13 includes a central processing unit (CPU) 100 implemented inside the communication terminal 13 as hardware. The communication terminal 13 further includes a read only memory (ROM) 101, and a random access memory (RAM) 102. The communication terminal 13 further includes a flash memory 103, a solid state drive (SSD) 104, a media drive 105, an operations button 27, a power supply switch 28, and a network interface (I/F) 106. The communication terminal 13 further includes a charge coupled device (CCD) 107, an image sensor I/F 108, and a speaker 110. The communication terminal 13 further includes a sound input/output I/F 111, a display I/F 112, an external apparatus connecting I/F 113, an alarm lamp 29, and a bus line 114.

The CPU 100 is configured to control the overall communication terminal 13. The ROM 101 is configured to store programs to be executed by the CPU 100 to cause the communication terminal 13 to function as the later-described units. The RAM 102 is configured to be utilized as a work area when the CPU 100 executes the above-described programs. The flash memory 103 is configured to store various types of data such as image data. The SSD 104 is configured to control the reading from or writing into the flash memory 103 the various types of data based on the control of the CPU 100.

The media drive 105 is configured to control the reading from or writing (storing) data into a recording medium 115 such as the flash memory. The operations button 27 is configured to be operated when the communication terminal 13 serving as a transmission destination is selected. The power supply switch 28 is configured to switch ON or OFF the power supply of the communication terminal 13. The network I/F 106 is configured to connect the communication terminal 13 to the communication network and enable the communication terminal 13 to transmit and receive data via the communication network.

The CCD 107 serves as a built-in camera 51 and is configured to image the attendees, and the like of the conference as imaging subjects to acquire image data of the imaged subjects based on the control of the CPU 100. Note that in this example, the CCD is used as the built-in camera 51; however, the built-in camera is not limited to the CCD, and a complementary metal oxide semiconductor (CMOS), or the like may be used as the built-in camera. The image sensor I/F 108 is configured to control driving of the CCD 107. The microphone 109 is configured to receive inputs of voice of the attendees of the conference, ambient sound or noise, and the like. The speaker 110 is configured to output audio data transmitted from other communication terminals 13. The sound input/output I/F 111 is configured to process inputs and outputs of audio signals between the microphone 109 and the speaker 110 based on the control of the CPU 100. Examples of the processes of inputs and outputs of the audio signals include elimination of noise, conversion of analog signals into digital signals, conversion of digital signals into analog signals, and the like.

The display I/F 112 is configured to transmit image data to an external display 14 based on the control of the CPU 100. The external apparatus connecting I/F 113 is configured to transmit and receive various types of data between the communication terminal 13 and an external apparatus. The alarm lamp 29 is configured to be turned on to report the abnormality of various functions of the communication terminal 13. The bus line 114 is configured to serve as an address bus or a data bus for electrically connecting between the above-described hardware components. Note that the address bus is configured to be used for transmitting a physical address at which data desired to be accessed are stored, and the data bus is configured to be used for transmitting data.

The display 14 and the display I/F 112 are configured to be connected via a cable 34. The cable 34 may be an analog RGB (VGA) signal cable or a component video cable. Alternatively, the cable 34 may be a high-definition multimedia interface (HDMI) or a digital video interactive (DVI) signal cable.

Examples of the external apparatus include an external camera, an external microphone, an external speaker, and the like in addition to the external input unit 15. The external apparatus is configured to be connected to the external apparatus connecting I/F 113 via a universal serial bus (USB) cable, and the like inserted into the connecting port 31 of the housing 20. Note that when the external camera is connected as the external apparatus, the external camera is configured to be driven in priority to the camera 51 based on the control of the CPU 100. Likewise, when the external microphone or external speaker is connected as the external apparatus, the external microphone or external speaker is configured to be driven in priority to the camera 51.

The recording medium 115 is configured to be removable with respect to the communication terminal 13. Examples of the recording medium 115 include retrievable and rewritable recording media such as a compact disk rewritable (CD-RW), a digital versatile disk rewritable (DVD-RW), a secure digital (SD) card, and the like. The flash memory 103 is employed as the recording medium 115 in the example of FIG. 3; however, the recording medium 115 may be any non-volatile memory insofar as the non-volatile memory is retrievable (readable) and rewritable. An example of the non-volatile memory includes electrically erasable and programmable ROM (EEPROM).

Note that the above-described programs are stored in the ROM 101; however, these programs may be stored in a recording medium (e.g., the recording medium 115) having an installable format or executable format that is readable by the communication terminal 13. In a case of the system configuration illustrated in FIG. 1, the programs provided by the program providing server 12 may be stored in the above-described recording medium.

Figure 4:
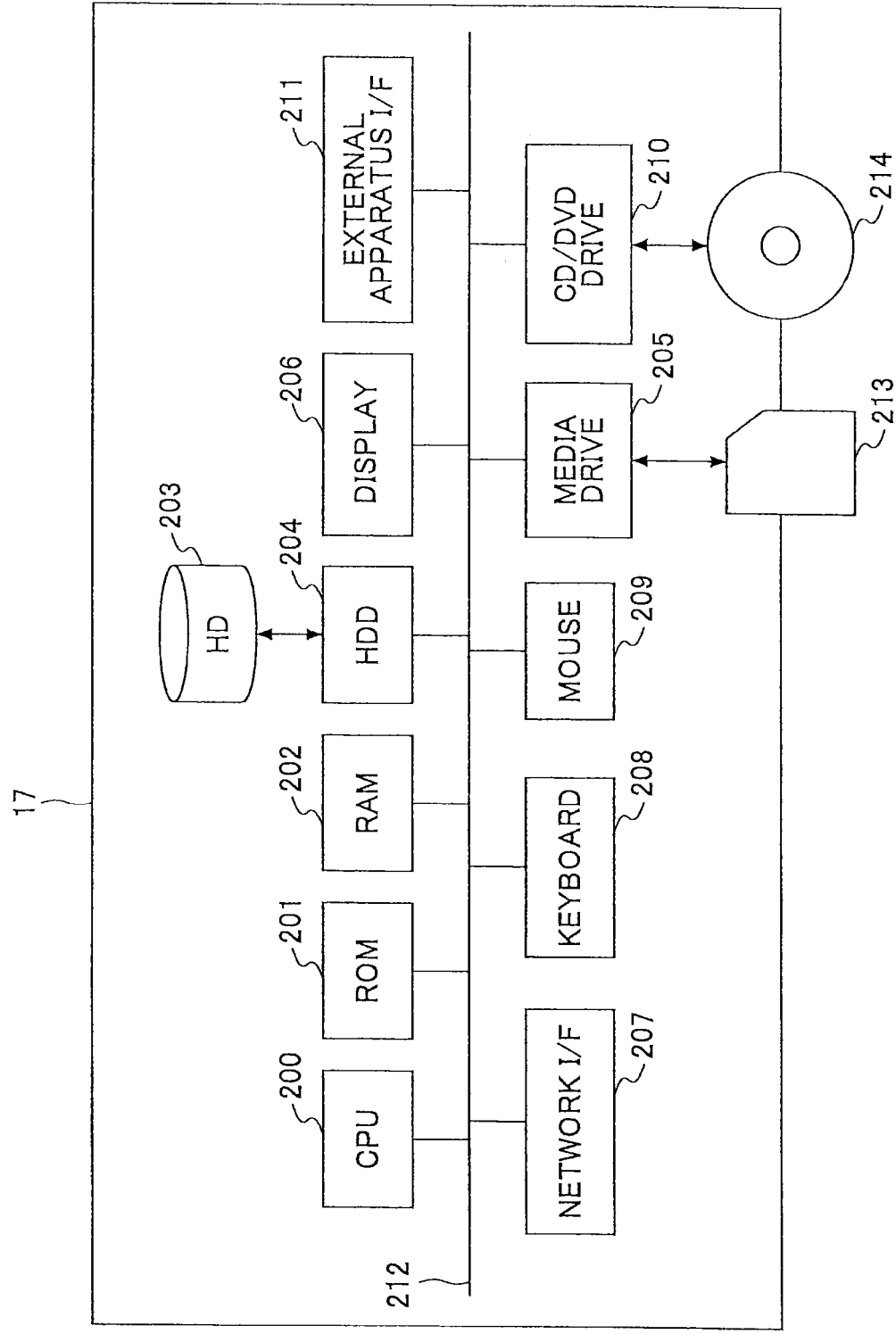
FIG. 4 is a hardware configuration diagram illustrating an example of a relay device for use in the teleconferencing system of one embodiment.

Next, hardware configurations of the management server 11, the program providing server 12, and the relay device 17 are briefly illustrated by referring to FIG. 4. The hardware configurations of the above-described components are similar to one another, and hence, the hardware configuration of the relay device 17 is representatively illustrated. Note that the maintenance system not illustrated in FIG. 1 includes the hardware configuration similar to those of the above-described components.

The relay device 17 is configured to include a central processing unit (CPU) 200, a read only memory (ROM) 201, a random access memory (RAM) 202, and a hard disk (HD) 204. The relay device 17 is configured to further include a media drive 205, a display 206, a network I/F 207, a keyboard 208, a mouse 209, a CD/DVD drive 210, an external apparatus I/F 211, and a bus line 212.

The CPU 200 is configured to control the overall relay device 17. The ROM 201 is configured to store programs for the CPU 200 to execute a process relaying communications between the communication terminals 13. The RAM 202 is configured to serve as a work area used by the CPU 200 when the programs are executed by the CPU 200. The HD 203 is configured to store various types of data, and the HDD 204 is configured to control retrieving (reading) from or writing into the HD 203 the various types of data based on the control of the CPU 204.

The media drive 205 is configured to control reading (retrieving) from or writing into a recording medium 213 such as flash memory. The display 206 is configured to display various types of information such as a cursor, a menu, a widow, characters, images, and the like. The network I/F 207 is configured to connect the relay device 17 to a communication network and enable the relay device 17 to transmit and receive data via the communication network. The keyboard 208 is configured to include plural keys to be pressed for inputting various instructions. The mouse 209 is configured to select various instructions, execute such instructions, select processes to be performed, and move a cursor.

The CD/DVD drive 210 is configured to control reading (retrieving) from or writing into a removable recording medium 214 such as the CD-RW, and the like. The external apparatus I/F 211 is configured to connect an external apparatus to the relay device 17 so as to transmit and receive various types of data between the relay device 17 and the external apparatus. The bus line 212 is configured to serve as an address bus or a data bus for electrically connecting between the above-described hardware components.

Note that the above-described programs are stored in the ROM 201; however, these programs may be stored in a recording medium having an installable format or executable format such as the HD 203 or the recording medium 213 that is readable by the relay device 17. In a case of the system configuration illustrated in FIG. 1, the programs provided by the program providing server 12 may be stored in the above-described recording medium.

Figure 5:
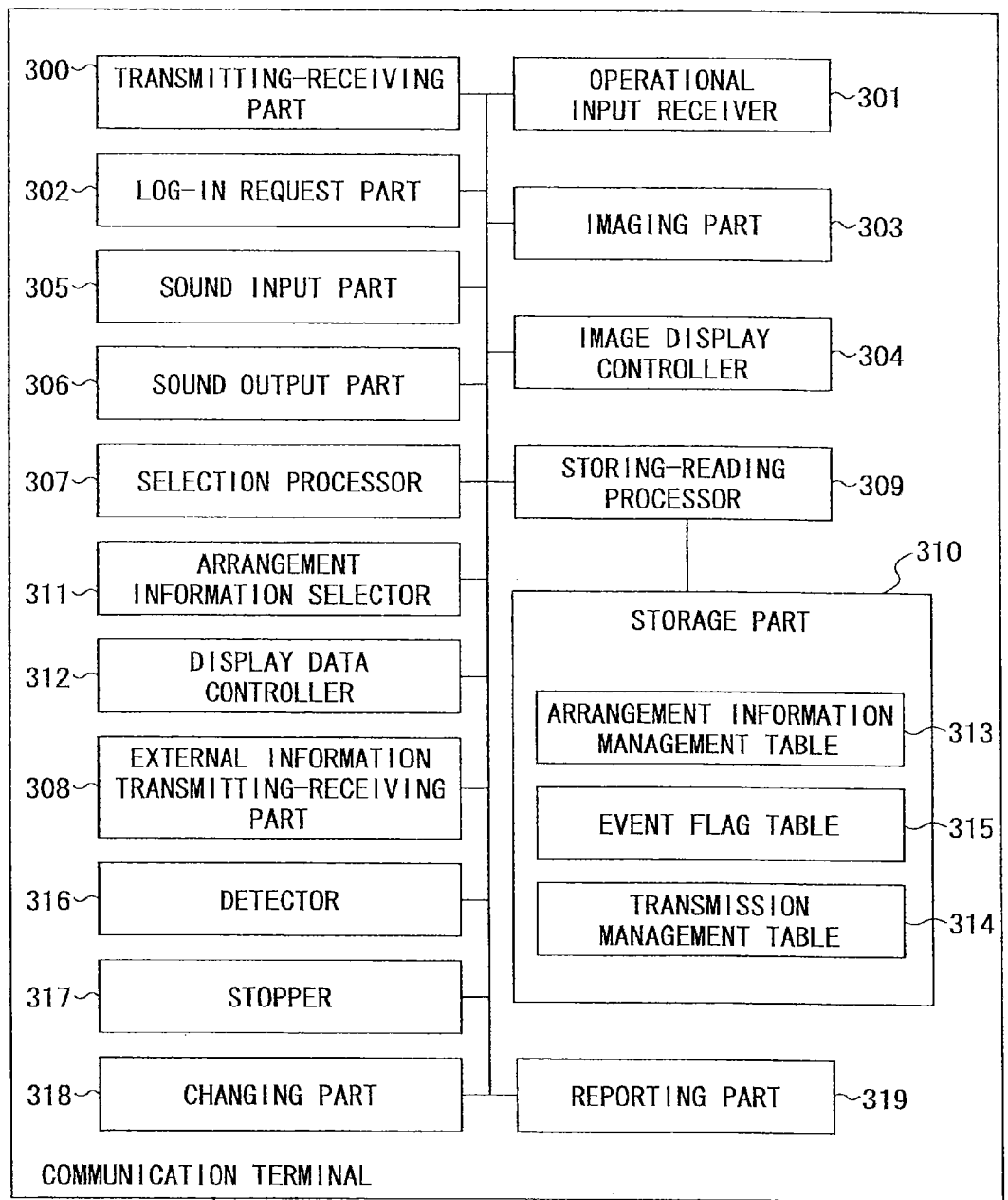
FIG. 5 is a functional block diagram illustrating the communication terminal of one embodiment.

Next, a functional configuration of the communication terminal 13 is illustrated by referring to a functional block diagram of the communication terminal 13 illustrated in FIG. 5. The communication terminal 13 is configured to include a transmitting-receiving part 300, an operational input receiver 301, a log-in request part 302, an imaging part 303, an image display controller 304, a sound input part 305, and a sound output part 306. The communication terminal 13 is configured to further include a selection processor 307, an external information transmitting-receiving part 308, a storing-reading processor 309, a storage part 310, an arrangement information selector 311, and a display data controller 312. These parts may be implemented by causing the corresponding components illustrated in FIG. 3 to operate based on the instructions from the CPU 100 in compliance with the programs stored in the ROM 101.

The transmitting-receiving part 300 is implemented by the network I/F 106 illustrated in FIG. 3, and configured to transmit and receive various data or information between this communication terminal 13 and other communication terminals 13 via the communication network. The operational input receiver 301 is implemented by the operations button 27 or the power supply switch 28, and configured to receive various types of inputs from an attendee of the conference, that is, a user of this communication terminal 13 in this example. For example, when the user switches ON the power supply switch 28, the operational input receiver 301 detects the user's switching ON operation to switch ON the power of the communication terminal 13.

The log-in request part 302 is implemented based on the instructions from the CPU 100 illustrated in FIG. 3. The log-in request part 302 is configured to automatically transmit log-in request information indicating a log-in request or a current IP address of the communication terminal 13 from the transmitting-receiving part 300 to the management server 11 illustrated in FIG. 1 in response to the power being switched ON. Note that examples of the log-in information include a terminal ID and a password of the communication terminal 13, and the like.

The imaging part 303 is implemented by the CCD 107 and the image sensor I/F 108 illustrated in FIG. 3, and configured to image a face and the like of the user (i.e., the attendee of the conference), convert the captured image into image data, and transmit the image data. The imaging part 303 is configured to transmit image data of one of static and dynamic images, or image data of both static and dynamic images. The imaging part 303 may transmit, when image data are dynamic ones, the image data as streaming delivery via the transmitting-receiving part 300.

The image display controller 304 is implemented by the display I/F 112 illustrated in FIG. 3, and configured to control transmission of the image data to the display 14.

The sound input part 305 is implemented by the CCD 109 and the sound input/output I/F 111 illustrated in FIG. 3, and configured to input voice and the like of the user (i.e., the attendee of the conference), convert the input voice into audio data, and transmit the audio data. The sound input part 305 is configured to determine presence or absence of audio signals by measuring signal levels of input signals and comparing the measured signal levels with a threshold or the like, convert, when the audio signals are present, the audio signals into audio data, and transmit the audio data. The sound output part 306 is implemented by the speaker 110 and the sound input/output I/F 111 illustrated in FIG. 3, and configured to convert audio data received from other communication terminals 13 into voice, and transmit the voice.

The selection processor 307 is implemented by instructions from the CPU 100 illustrated in FIG. 3, and configured to execute a process selecting one of the relay devices 17a to 17d illustrated in FIG. 1 via which data are transmitted or received. The selection processor 307 may, for example, be configured to include a measuring part, a computing part, and a selecting part, and execute a process of selecting one of the relay devices 17a to 17d using these parts.

The measuring part is configured to measure received date and time at which pre-transmission information is received by the transmitting-receiving part 300 for every pre-transmission information item received by the transmitting-receiving part 300 including transmission date and time. Note that the pre-transmission information is transmitted via the relay device 17 to other communication terminals 13 prior to transmission of the image data or the like. The pre-transmission information is used for measuring a time required for transmitting data from a request source communication terminal (a request source terminal) to a destination communication terminal (a destination terminal). The pre-transmission information includes pinging for testing whether the request source terminal and the destination terminal are communicatively connected, and transmission date and time at which the request source terminal receives the pre-transmission information. The pre-transmission information further includes a session ID for identifying a series of communications (i.e., a session) from the start of the conference at which the user is logged in to the end of the conference at which the use is logged off.

The computing part is configured to compute the difference between received date and time measured by the measuring part and transmission date and time included in the pre-transmission information to compute the time required for transmitting data for every pre-transmission information item, received date and time which are measured by the measuring part. The selecting part is configured to compare the required times computed by the computing part between the relay devices and select one of the relay devices 17 exhibiting a shortest one of the required times. Hence, the selection processor 307 is able to select one of the relay devices 17a to 17d as described above.

The external information transmitting-receiving part 308 is implemented by the external apparatus connecting I/F 113 illustrated in FIG. 3, and configured to perform a process of receiving data from the external apparatus and/or a process of transmitting data to the external apparatus. The external information transmitting-receiving part 308 is, when the external apparatus is an external camera or external microphone, configured to receive image data from the camera or audio data from the microphone, or when the external apparatus is an external speaker, configured to transmit audio data to the speaker.

The storing-reading processor 309 is implemented by the SSD 104 illustrated in FIG. 3, and configured to perform a process of storing various types of data in the storage part 310 and/or a process of retrieving various types of data from the storage part 310. The storing-reading processor 309 is configured to store a terminal ID for identifying the communication terminal 13, a password, image data, audio data, a relay device ID for identifying the relay device 17 configured to transmit other various types of data, an IP address of the destination terminal, and the like. The storage part 310 is configured to store an arrangement information management table 313, a transmission management table 314, an event flag table 315, and the like.

The arrangement information selector 311 is configured to select a shared flag from the event flag table 315 stored in the storage part 310 based on a delivery event of display data. Further, the arrangement information selector 311 is configured to set the shared flag in the arrangement information management table 313, and indicate screen arrangement information to be displayed on the display 14. Examples of the delivery event include a "delivery start event" generated at the time of starting to deliver display data, and a "delivery stop event" generated at the time of stopping the delivery. Examples of the delivery event further include "another delivery event" generated at the time of another communication terminal starting to deliver display data, and "another delivery stop event" generated at the time of another communication terminal stopping the delivery.

The arrangement information selector 311 is configured to indicate arrangement information to display the display data corresponding to the "delivery start event" or "delivery stop event" based on the display data that start being delivered or that are received by the communication terminal 13.

The display data controller 312 is configured to control acquisition of the display data from the external apparatus 15 and transmission of the acquired display data to the communication terminal 13. The display data may be image data having a file format such as joint photographic experts group (JPEG) or a bitmap format displayed on a display screen of the external input unit 15. The display data may further be a rendering command having a file format for such as graphic device interface (GDI).

The display data controller 312 is configured to request the relay device 17 to start delivering the display data or to stop delivering the display data in response to a request from the external input unit 15. The display data controller 312 is further configured to determine a status of a display control flag by referring to the event flag table 315 in response to a delivery event from the relay device 17, and transmit the display control flag to the external input unit 15. The display control flag is used by the communication terminal 13 to control a display of the external input unit 15 that displays images such as a menu or the like.

Note that the event flag table 315 is configured to manage, for example, types of events such as the above-described "delivery start event", and the like, in association with a shared flag indicating whether the communication terminals 13 share the display data, and a display control flag. The arrangement information management table 313 is configured to manage, for example, arrangement information in association with the shared flag.

The transmission management table 314 is configured to manage transmission information as to whether the image data captured by the imaging part 303 are transmitted to the relay device 17, and whether the display data input from the external input unit 15 are transmitted to the relay device 17.

For example, the arrangement information selector 311 is configured to detect the generation of the delivery stop event when the display data from the external input unit 15 have been stopped. The arrangement information selector 311 is configured to set a shared flag indicating that the display data are not shared in the arrangement information management table 313, and indicate arrangement information of a screen display excluding the display data to the image display controller 304. The image display controller 304 is configured to switch, on receiving the instruction, the screen that has been displayed, and change a transmission status of the transmission management table 314.

FIG. 6 is a diagram illustrating an example of the transmission management table 314. The transmission management table 314 is configured to manage a data name for specifying data transmitted to the relay device 17 in association with a transmission status of the data being transmitted to the relay device 17. The data name includes "video data", "display data", and the like, serving as an example of image data. The transmission status includes information indicating whether data are currently transmitted. The transmission status is set as "TRUE" when data are currently transmitted, whereas the transmission status is set as "FALSE" when data are not currently transmitted. The table illustrated in FIG. 6 is an example of the transmission management table 314, which may further include information such as a conference name, date and time, types of data other than those illustrated in the table of FIG. 6. In the following illustration, video data serve as the image data.

The storage part 310 is configured to further store a table illustrated in FIG. 7. FIG. 7 is a diagram illustrating a relationship between arrangement information and video data or display data allocated to each of divided areas of the screen. The arrangement information is associated with displays of the video data and the display data. Examples of the arrangement information include "SHARED_MULTI", "SHARED_ONLY", "VIEW_MULTI", and "VIEW_ONLY" as illustrated in FIG. 7.

The "SHARED_MULTI" indicates displaying a mixture of all the video data and display data received from the communication terminals 13 used in the same conference. The "SHARED_ONLY" indicates displaying enlarged display data alone. The "VIEW_MULTI" indicates displaying all the video data received from the communication terminals 13 used in the same conference, and not displaying display data. The "VIEW_ONLY" indicates displaying an enlarged specific one of the video data.

Figure 8A:
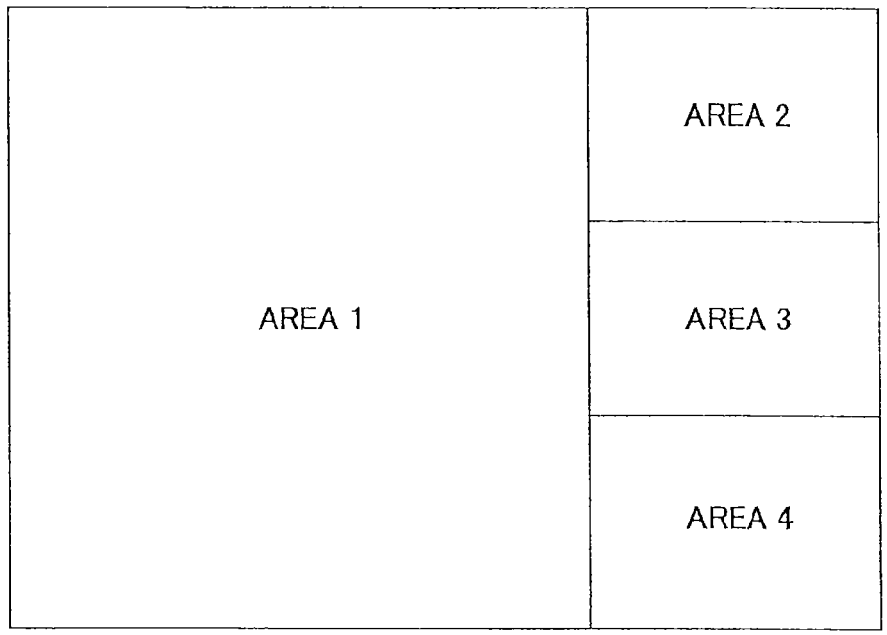
FIGS. 8A and 8B are diagrams illustrating an example of a partitioned display, and an example of partitioned areas.
Figure 8B:
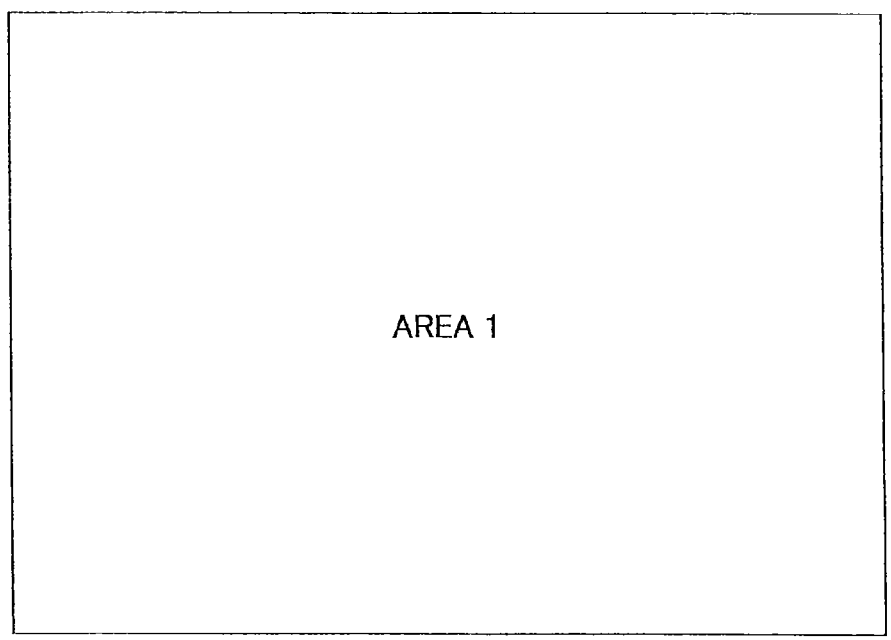

The image display controller 304 is configured to determine a display configuration by referring to the table as to how to display data on the display 14, based on the arrangement information indicated by the arrangement information selector 311, and display the data on the display 14 in the determined manner. FIGS. 8A and 8B are examples of actually displayed screens.

FIG. 8A illustrates a screen displayed when the "SHARED_MULTI" and "VIEW_MULTI" are selected as the arrangement information. Note that the example of FIG. 8A illustrates areas 1 to 4. However, in a case of the "SHARED_MULTI", the area 1 displays the display data, and the areas 2 to 4 display video data 1 to 3, respectively. That is, conference documents and the like are displayed in the area 1, and communication partners, who are the attendees of the same conference, are displayed in the areas 2 to 4, respectively. In a case of the "VIEW_MULTI", the video data 1 are displayed in the area 1, and the video data 2 to 4 are displayed in the areas 2 to 4, respectively.

FIG. 8B illustrates a screen displayed when the "SHARED_ONLY" and "VIEW_ONLY" are selected as the arrangement information. Note that the example of FIG. 8B illustrates an area 1 alone. However, in a case of the "SHARED_ONLY", the area 1 displays the display data, and in a case of the "VIEW_ONLY", the area 1 displays enlarged video data 1. Note that since the area 1 in FIG. 8B displays the display data or the video data 1 alone, the display data or the video data 1 may be displayed larger in the area 1 in FIG. 8B than in the area 1 in FIG. 8A. Thus, the enlarged video data 1 are displayed in the area 1 in FIG. 8B. However, the example of the screen is not limited to the above described configuration. The screen may be configured such that the area 1 in FIG. 8B displays one set of data in the same size, which are enlarged or reduced in a desired size via separately provided buttons or the like on the screen.

Further, in the example of FIG. 8A, the screen is divided such that area 1 has a large size, and the areas 2 to 4 have the same sizes, which are smaller than the size of the area 1. However, the example of the screen is not limited to the above-described configuration. For example, the screen may be equally divided into the same sizes, or the number of divided areas may be two, three, or five or more. Note that the received audio data are played while displaying the video data. Hence, the attendees of the conference may recognize which one of users (i.e., attendees of the conference) is currently speaking, and what kind of content the attendee is speaking about.

As illustrated in FIG. 5, the communication terminal 13 is configured to further include a detector 316, a stopper 317, a changing part 318, and a reporting part 319. Note that in this example, the communication terminal 13 is configured to include the changing part 318 and the reporting part 19; however, the communication terminal 13 may be configured to exclude the changing part 318 and the reporting part 19. These parts of the communication terminal 13 may be implemented by causing the components illustrated in FIG. 3 to operate based on instructions from the CPU 100 in compliance with the programs stored in the ROM 101.

The detector 316 is configured to detect a predetermined event indicating that capturing images is continuously executed but transmission of data is not required any more. Since capturing images is continuously executed, depression of a recording stop button is excluded from this predetermined event. The followings are examples of such a predetermined event.

An example of the predetermined event includes the camera 51 configured to capture images and output video data being disposed within the resting part 33. The camera 51 is still continuously capturing images by being disposed within the resting part 33; however the camera 51 is unable to capture images of the user (the attendee) and the like. Hence, transmission of video data may be unnecessary. More specifically, the predetermined event (i.e., placing the camera 51 within the resting part 33) indicates that the arm 40 of the communication terminal 13 illustrated in FIG. 2 is folded. In addition, the predetermined event further indicates covering the camera 51 with a protecting member, that is, attaching a cap to the camera 51.

Moreover, the predetermined event further indicates starting to transmit or receive display data between the communication terminal and other communication terminals after the external input unit 15 for inputting the display data into the communication terminal 13 is connected to the communication terminal 13. That is, the predetermined event further indicates starting the conference. When the external input unit 15 is connected to the communication terminal 15 before the start of the conference, all the users of the communication terminals 13 attending the same conference need to have their attention drawn to display data alone. Hence, transmission of video data is not necessary despite the fact that the images of the users of the communication terminals 13 are being captured.

Further, the predetermined event further indicates receiving from the relay device 17 a report indicating that none of the communication terminals 13 used in the same conference receives video data transmitted from the communication terminal 13. Since none of the communication terminals uses the video data, the video data are unnecessary.

Note that the predetermined event is not limited to the above-described examples. For example, the predetermined event may be setting a mode for a user to transmit display data alone from a user interface (UI). Further, the predetermined event may be starting the conference with the arm 40 being folded.

The stopper 317 is configured to instruct the imaging part 303 to stop capturing images (i.e., stop imaging a subject, and the like), and instruct the transmitting-receiving part 300 to stop transmitting the video data, in response to detection of the above-described predetermined event. The stopper 317 is configured to stop supplying power to the imaging part 303, that is, the camera 51, after capturing images and transmitting the video data are stopped. Hence, the usage rate of the CPU 100 may be lowered by stopping capturing images and stopping transmitting the video data, which may eventually lower energy consumption. In addition, the power supplied to the imaging part 303 is also stopped, which may further lower the energy consumption.

The changing part 318 is configured to change contents serving as transmission information set in the transmission management table 314 in response to detection of the above-described event. Specifically, when the changing part 318 detects the arm 40 being folded as the predetermined event, the changing part 318 changes a setting to stop transmitting image data. This is because the folded arm 40 indicates that the camera function is unused. More specifically, the changing part 318 changes the setting of the video data "TRUE" into "FALSE" as illustrated in FIG. 6.

In addition, when the changing part 318 detects initiation of the conference after a cable connected to the external input unit 15 is inserted in a connecting port 31a, the changing part 318 changing a setting to stop transmitting video data. This is because the attendees of the conference need to have their attention drawn attention to display data alone, which indicates the transmission of video data is unnecessary. Further, when the changing part 318 detects that none of the communication terminals used in the same conference including the own communication terminal 13 use video data captured by the own communication terminal 13, the changing part 318 changes a setting to stop transmitting the imaged video data.

The reporting part 319 is configured to report the setting change in the transmission management table 314 to the relay device 17 after the changing part 318 changes the setting. The relay device 17 receives the report of the transmission management table 314, and changes the management information associated with the setting change. The reporting part 319 may transmit the transmission management table 314, or may transmit the changed part of the transmission management table 314 alone.

In the following, a functional configuration of the relay device 17 is briefly described by referring to FIG. 9. The relay device 17 is configured to include a transmitting-receiving part 400, a controller 401, a storing-reading processor 402, a storage part 403, and a changing part 404.

The transmitting-receiving part 400 is implemented by the network I/F 207 illustrated in FIG. 4. The transmitting-receiving part 400 is configured to receive, when the arrangement information is changed or the transmission management table 314 is changed in the communication terminal 13, the changed arrangement information or the changed transmission management table 314 reported by the communication terminal 13.

The transmitting-receiving part 401 is implemented based on the instructions from the CPU 200 illustrated in FIG. 4. The controller 401 is configured to perform control by instructing the storing-reading processor 402 to receive data in compliance with the contents set in the reception management table 405 as management information stored in the storage part 403. Further, the controller 401 is configured to perform control by instructing the storing-reading processor 402 to transmit the received data in compliance with the contents set in the transmission management table 406.

FIG. 10 is a diagram illustrating an example of the reception management table 405 retained and managed as one of management information by the relay device 17. The reception management table 405 is configured to manage a terminal ID in association with a data name, and a reception status. The terminal ID identifies from which one of the communication terminals 13 video data or display data are received as the image data, and the data name identifies received video data or display data. The reception status includes information indicating whether the relay device 17 is receiving data. The reception status is set as "TRUE" when the relay device 17 data is currently receiving data, whereas the reception status is set as "FALSE" when the relay device 17 data is not currently receiving data.

Note that in this example, the terminal ID is used for identifying the communication terminal 13; however, an item for identifying the communication terminal 13 is not limited to the terminal ID. The item for identifying the communication terminal 13 may be any items such as a terminal name, an IP address, a MAC address, and a terminal setting place (e.g., Tokyo Office) insofar as the item may be able to uniquely identify the communication terminal 13.

FIG. 11 is a diagram illustrating an example of the reception management table 406 retained and managed by the relay device 17 as one of management information. The transmission management table 406 is configured to manage a terminal ID in association with a data name, and a transmission status. The terminal ID identifies to which one of the communication terminals 13 video data or display data are transmitted as the image data, and the data name identifies transmitted video data or display data. The transmission status includes information indicating whether the relay device 17 is transmitting data. The transmission status is set as "TRUE" when the relay device 17 data is currently transmitting data, whereas the transmission status is set as "FALSE" when the relay device 17 data is not currently transmitting data. Note that an item for identifying the communication terminal 13 is not limited to the terminal ID, and may be a terminal name, and an IP address, or the like in this transmission management table 406 in a manner similar to the reception management table 405 illustrated in FIG. 10.

Referring back to FIG. 9, the arrangement information or the transmission management table 314 received by the transmitting-receiving part 400 is transmitted to the changing part 404, which then instructs the storing-reading processor 402 to read (retrieve) the reception management table 405 or the transmission management table 406. The changing part 404 changes the corresponding reception status(es) in the reception management table 405 based on the contents of the transmission management table 314, and changes the corresponding transmission status(es) in the transmission management table 406 based on the arrangement information.

For example, when the transmission management table 406 is changed such that the transmission status of a certain communication terminal 13 is set as "FALSE", the relay device 17 stops transmitting video data to that communication terminal 13, which results in lowering network load. The relay device 17 may further include a determining part and a reporting part in addition to the above-described components. The determining part may be configured to determine whether there are video data to be transmitted to none of the communication terminals 13. Further, when the determining part determines that there are video data to be transmitted to none of the communication terminals 13, the reporting part is configured to report terminating transmission of the video data to all the communication terminals 13 to which the video data are to be transmitted. Hence, the transmission of the video data from each of the communication terminals 13 to the relay device 17 is terminated, which further lowers the network load.

In addition, when the determining part determines that not all the video data are transmitted to any of the communication terminals 13 listed in the changed transmission management table 406, the controller 401 may be able to stop transmitting the video data to all the communication terminals 13. At this moment, the reporting part may be able to report terminating the transmission of the video data to all the communication terminals 1 to which the video data are to be transmitted. Note that the determining part and the reporting part may also be implemented based on instructions from the CPU 200 illustrated in FIG. 4.

Figure 9:
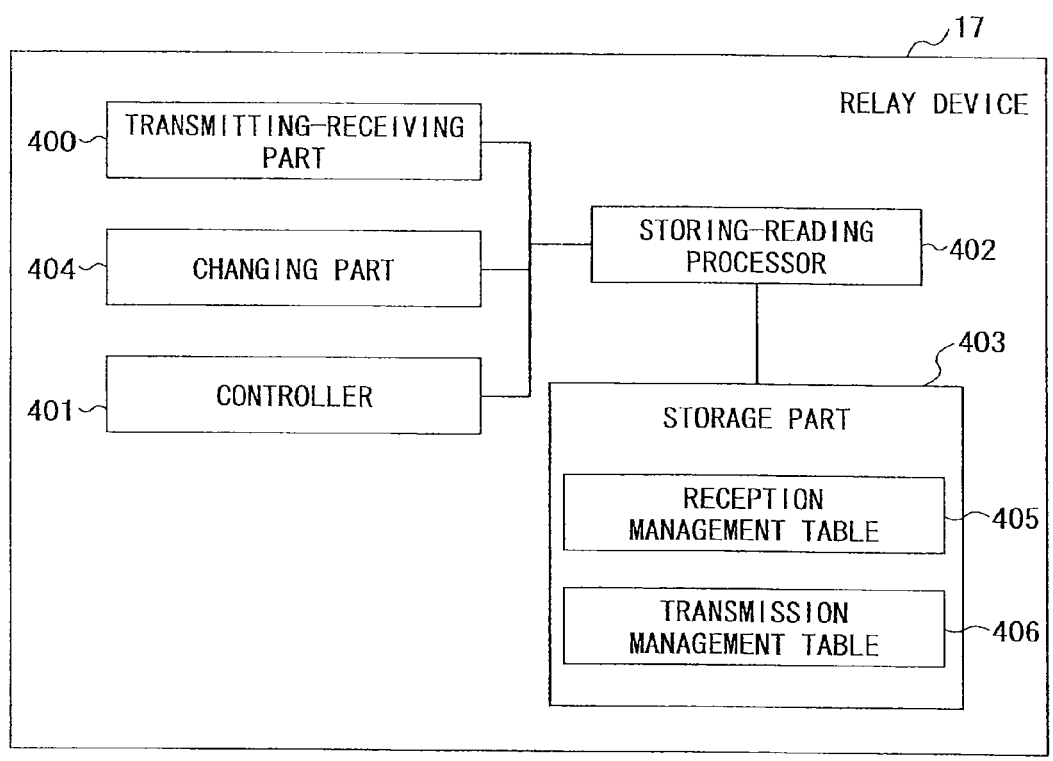
FIG. 9 is a functional block diagram illustrating a relay device.
Figure 12:
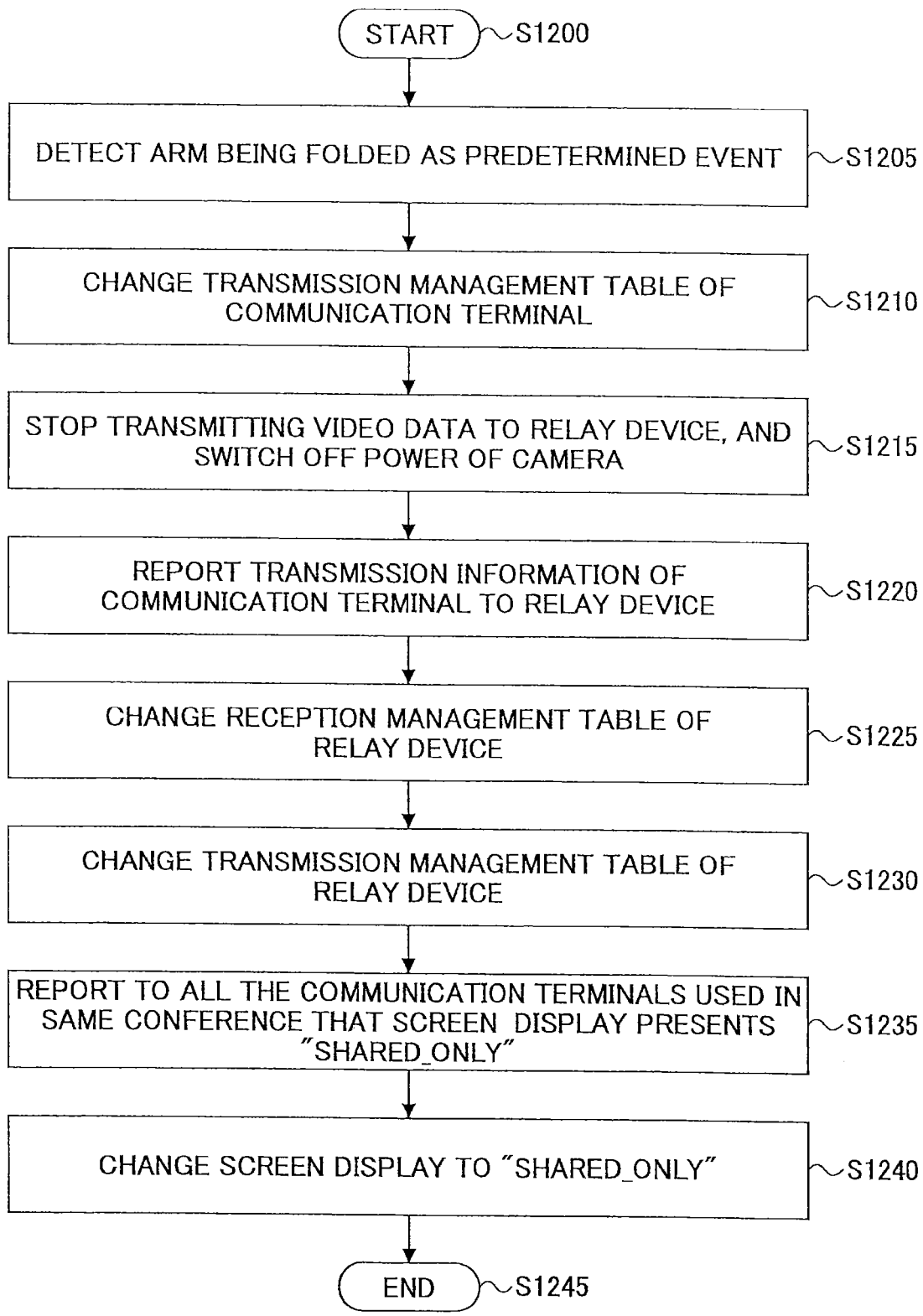
FIG. 12 is a flowchart illustrating a first process performed by the teleconferencing system.

Next, a description is given of a process implemented by a teleconference system illustrated in FIG. 1, which includes plural communication terminals 13 illustrated in FIG. 5, and plural relay devices 17 illustrated in FIG. 9. FIG. 12 is a flowchart illustrating a process of detecting the above-described arm 40 being folded as an event, and switching off the power of the camera.

Step 1200 initiates the process. In step S1205, the detector 316 of the communication terminal 13 detects the arm 40 being folded by a user of the communication terminal 13 as a predetermined event. Whether the arm 40 is folded is detected by a proximity sensor disposed inside the resting part illustrated in FIG. 2. The proximity sensor is configured to detect whether one of the arm 40, the camera housing 50, and the camera 51 arrives within a predetermined distance.

Alternatively, whether the arm 40 is folded may be detected by a pressure sensor configured to detect the arm 40 being folded by detecting a predetermined pressure or above when one of the arm 40, the camera housing 50, and the camera 51 contacts a projection disposed inside the resting part 33. Further, whether the arm 40 is folded may also be detected by measuring a position of the projection. In this case, the projection may be configured to be upwardly projected when the arm 40 is raised, and be depressed inside the resting part 33 by the arm when the arm is folded. Moreover, whether the arm 40 is folded may also be detected by an angle of the torque hinge 41 disposed on the arm 40. The above-described methods of detecting whether the arm 40 is folded are only examples, and other methods may also be employed.

When the detector 316 detects the predetermined event, the changing part 318 instructs the storing-reading processor 309 to retrieve the transmission management table 314 stored in the storage part 310 in step S1210 in response to the detection of the predetermined event. The changing part 318 changes the transmission status of the video data from the previous transmission status "TRUE" into a current transmission status "FALSE". The changing part 318 then instructs the storing-reading processor 309 to store the changed transmission management table 314 (i.e., the changed transmission status) in the storage part 310.

In step 1215, when the transmitting-receiving part 300 transmits the video data captured and output by the imaging part 303, the stopper 317 instructs the storing-reading processor 309 to retrieve the transmission management table 314. The stopper 317 refers to the transmission status being "FALSE" in the retrieved transmission management table 314 and instructs the transmitting-receiving part 300 to stop transmitting the video data to the relay device 17. Further, the stopper 317 instructs the imaging part 303 to stop capturing images and switch OFF the power of the camera in response to terminating the transmission of the video data. As a result, the energy consumption of the communication terminal 13 may be lowered.

In step S1220, the changed transmission management table 314 is reported to the relay device 17 as transmission information so as to change the management information retained by the relay device 17. So far, the process performed by the communication terminal 13 has been illustrated.

In the following, a description is given of a process performed by the relay device 17. In step S1225, the transmitting-receiving part 400 of the relay device 17 receives the above-described transmission information from the communication terminal 13, and the changing part 404 changes the reception management table 405 stored in the storage part 403 via the storing-reading processor 402 based on that received transmission information. That is, since the transmission status of the communication terminal 13 is "FALSE", there are no video data to be received from the communication terminal 13. Hence, the reception status is changed from "TRUE" to "FALSE" corresponding to the terminal ID of the communication terminal 13 having the transmission status "FALSE" in the reception management table 405.

In step S1230, the changing part 404 of the relay device 17 changes the transmission statuses from "TRUE" to "FALSE" corresponding to the video data of all the communication terminals 13 used in the same conference listed in the transmission management table 406. Then, the changing part 404 of the relay device 17 changes the transmission statuses to "TRUE" of display data corresponding to the terminal IDs of all the communication terminals 13. That is, when one of the video data sets is not transmitted, the display data are not displayed based on the arrangement information (i.e., screen display) "SHARED_MULTI". Accordingly, the arrangement information is changed from "SHARED_MULTI" to "SHARED_ONLY" such that the display data are, after the arrangement information is changed, displayed based on the arrangement information "SHARED_ONLY".

In this case, the changed arrangement information is not limited to "SHARED_ONLY". For example, when the video data are not the video data 1 illustrated in FIG. 7, the transmission status of the video data 1 corresponding to each of the terminal IDs is changed to "TRUE" such that the display data are displayed based on the arrangement information "VIEW_ONLY".

In step S1235, the controller 401 creates a message for changing the screen display (e.g., the arrangement information) to "SHARED_ONLY" with respect to all the communication terminals 13 used in the same conference, and the transmitting-receiving part 400 transmits and report the created message so as to display the display data based on "SHARED_ONLY". So far, the process performed by the relay device 17 has been illustrated.

Steps from step S1240 onward correspond to a process performed by the communication terminal 13. In step S1240, the communication terminal 13 receives the above report from the relay device 17, and the display data controller 312 transmits the display data to the display 14 to switch to a screen of the display 14 to display the display data alone. After the screen display has been switched, the process ends in step S1245.

Figure 13:
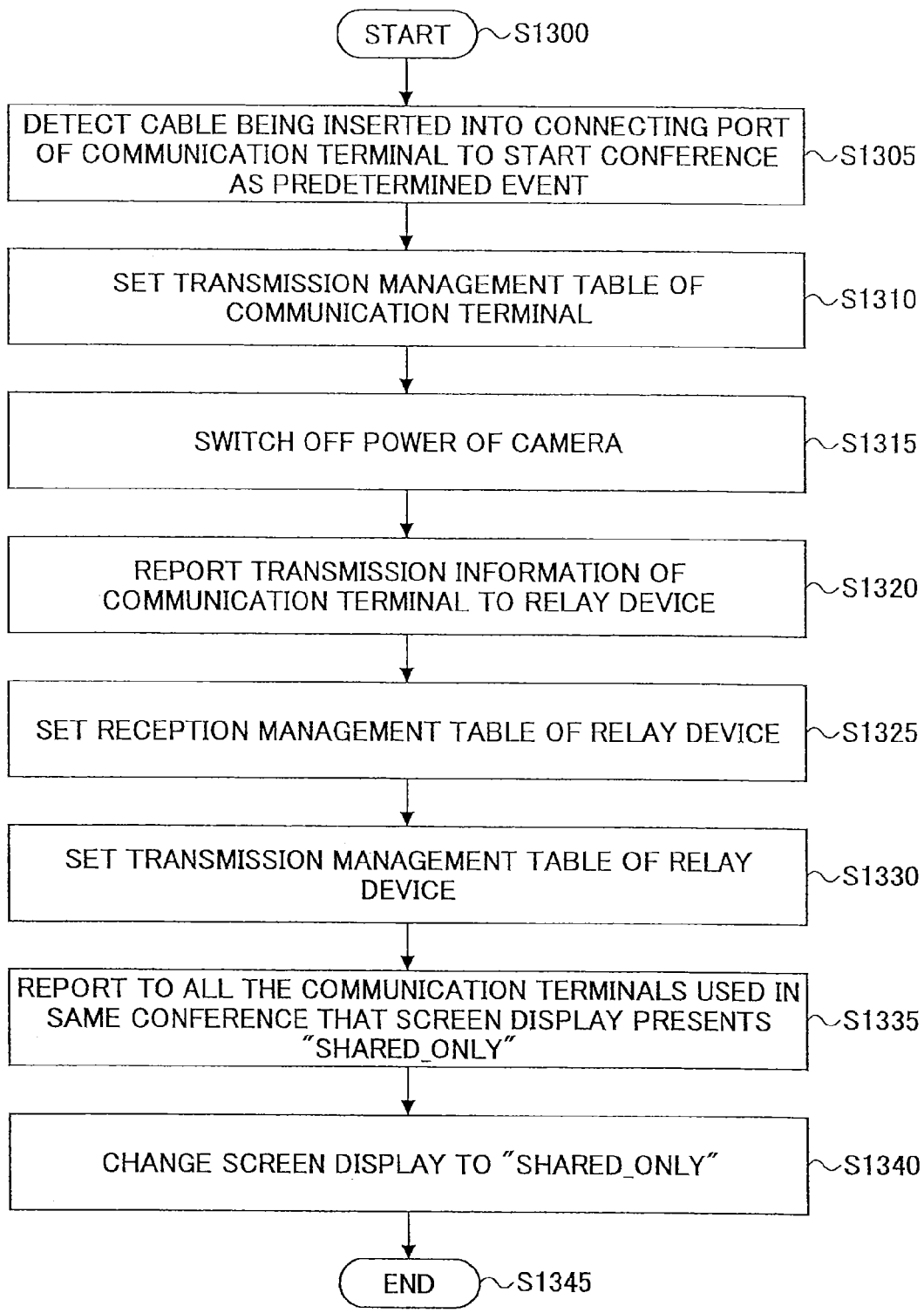
FIG. 13 is a flowchart illustrating a second process performed by the teleconferencing system.

FIG. 13 is a flowchart illustrating a process of detecting initiation of the conference after a cable connected to the above-described external input unit 15 has been inserted into the connecting port 31*a* as an event, and switching off the power of the camera.

Step 1300 initiates the process. In step S1305, the detector 316 of the communication terminal 13 detects initiation of the conference by detecting the cable being inserted in the connecting port 31*a* to start transmitting and receiving the data as a predetermined event. The insertion of the cable into the connecting port 31*a* indicates that the external input unit 15 and the communication terminal 13 communicate with each other to mutually recognize each other.

When the detector 316 detects this predetermined event, the changing part 318 sets a transmission status of the video data in the transmission management table 314 to "FALSE" in step S1310 in response to the detection of the predetermined event. The changing part 318 then instructs the storing-reading processor 309 to store the changed transmission management table 314 (i.e., the changed transmission status) in the storage part 310.

In step 1315, when the transmitting-receiving part 300 transmits the video data captured and output by the imaging part 303, the stopper 317 refers to the transmission management table 314, detects the transmission status of the video data being "FALSE", and then stops transmitting the video data. Further, the stopper 317 instructs the imaging part 303 to stop capturing images and switch off the power of the camera in response to terminating the transmission of the video data. As a result, the energy consumption of the communication terminal 13 may be lowered.

In step S1320, the changed transmission management table 314 is reported to the relay device 17 as transmission information so as to change the management information retained by the relay device 17. So far, the process performed by the communication terminal 13 has been illustrated.

In the following, a description is given of a process performed by the relay device 17. In step S1325, the transmitting-receiving part 400 of the relay device 17 receives the above-described transmission information from the communication terminal 13, and the changing part 404 changes the reception management table 405 based on that received transmission information. That is, since the transmission status of the communication terminal 13 is "FALSE", there are no video data to be received from the communication terminal 13. Hence, the changing part 404 sets the reception status to "FALSE" corresponding to the terminal ID of the communication terminal 13 in the reception management table 405.

In step S1330, the changing part 404 changes the transmission status to "FALSE" of all the video data in the transmission management table 406. Then, the changing part 404 changes the transmission status to "TRUE" of all the display data corresponding to the terminal IDs. That is, when one of the video data sets is not transmitted, the display data are not displayed based on the arrangement information "SHARED_MULTI". Accordingly, the arrangement information is changed from "SHARED_MULTI" to "SHARED_ONLY" such that the display data are, after the arrangement information is changed, displayed based on the arrangement information "SHARED_ONLY".

In this example, the changing part 404 changes the transmission status to "TRUE" of all the display data so as to display the display data based on "SHARED_ONLY". However, when the video data are not the video data 1 illustrated in FIG. 7, the transmission status of the video data 1 corresponding to each of the terminal IDs is changed to "TRUE" such that the display data are displayed based on the arrangement information "VIEW_ONLY".

In step S1335, the controller 401 creates a message for changing the screen display (e.g., the arrangement information) to "SHARED_ONLY" with respect to all the communication terminals 13 used in the same conference, and the transmitting-receiving part 400 transmits and reports the created message so as to display the display data based on "SHARED_ONLY". So far, the process performed by the relay device 17 has been illustrated.

Steps from step S1340 onward correspond to a process performed by the communication terminal 13. In step S1340, the communication terminal 13 receives the above report from the relay device 17, and the display data controller 312 transmits the display data to the display 14 and switches to a screen of the display 14 to display the display data alone. After the screen display has been switched, the process ends in step S1345.

Figure 14:
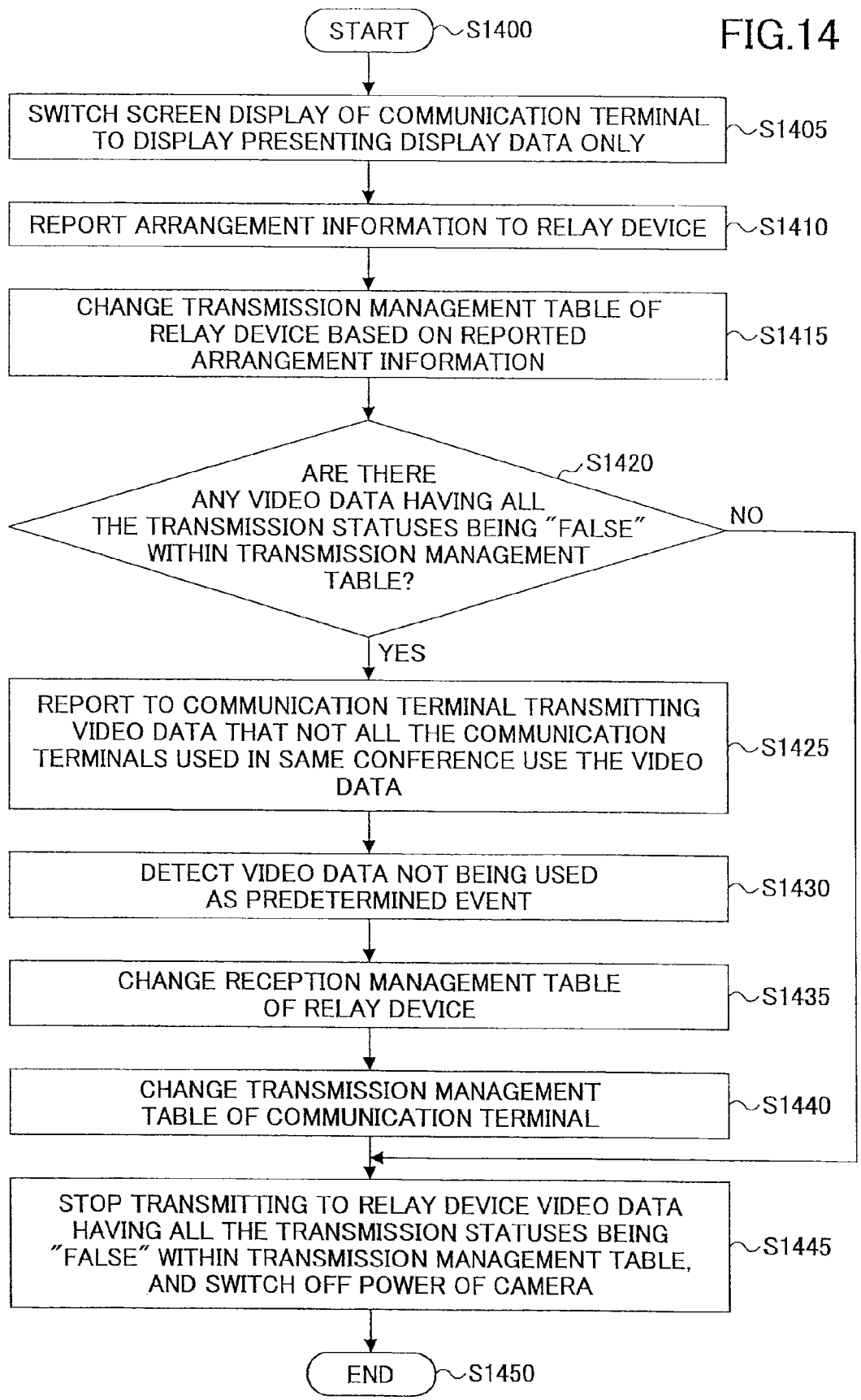
FIG. 14 is a flowchart illustrating a third process performed by the teleconferencing system.

FIG. 14 is a flowchart illustrating a process of detecting all the communication terminals 13 used for the same conference including the own communication terminal 13 not utilizing the image data captured by the own communication terminal 13 as an event, and switching off the power of the camera.

Step S1400 initiates the process. In step S1405, the operational input receiver 301 receives a setting change input from the user of the communication terminal 13, and the display data controller 312 transmits the display data to the display 14 to switch to a screen of the display 14 to display the display data alone.

In step S1410, the reporting part 319 reports to the relay device 17 the arrangement information for displaying the display data alone. So far, the process performed by the communication terminal 13 has been illustrated.

In the following, a description is given of a process performed by the relay device 17. In step S1415, the changing part 404 of the relay device 17 receives the above-described report from the communication terminal 13, and changes the transmission management table 406 stored in the storage part 403 via the storing-reading processor 406 based on that received report. That is, since the communication terminal 13 transmitting the report displays the display data alone, the video data are unnecessary. Hence, the transmission status corresponding to the terminal ID of the communication terminal 13 in the transmission management table 406 is changed from "TRUE" to "FALSE".

In step S1420, the determining part of the relay device 17 refers to the transmission management table 406 to determine whether there are any video data sets having all the transmission statuses being "FALSE". When there are some video data sets having all the transmission statuses being "FALSE", transmission of those video data sets may be stopped, which may lower network load. In addition, the power of the camera capturing the video data may be switched off, which may be able to lower the energy consumption.

When the determining part of the relay device 17 determines that there are no video data sets having all the transmission statuses being "FALSE" in step S1420, the process ends in step S1450. By contrast, when the determining part of the relay device 17 determines that there are some video data sets having all the transmission statuses being "FALSE" in step S1420, the video data sets not being used by all the communication terminals 13 used in the same conference are reported to the communication terminal 13 that is currently transmitting the video data in step S1425. The reporting the video data not being used by all the communication terminals 13 used in the same conference may be implemented by causing the controller 401 to create a message and causing the transmitting-receiving part 400 to transmit the created message as described above.

Further, in step S1430, the changing part 1430 changes the transmission status of the video data from "TRUE" into "FALSE". This is because transmission of the video data that have been transmitted is terminated in response to the reception of the report. So far, the process performed by the relay device 17 has been illustrated.

Steps from step S1435 onward correspond to a process performed by the communication terminal 13 again. In step S1435, the detector 316 of the communication terminal 13 detects the report indicating that the above video data being unused in any of the communication terminals 13 used in the same conference as an event. In step S1440, the changing part 318 instructs the storing-reading processor 309 to retrieve the transmission management table 314 stored in the storage part 310 in response to the detection of the event, and change the transmission status of the video data from the previous "TRUE" to the current "FALSE". The changing part 318 then instructs the storing-reading processor 309 to store the changed transmission management table 314 in the storage part 310.

In step 1445, the stopper 317 instructs the storing-reading processor 309 to retrieve the transmission management table 314. The stopper 317 refers to the changed transmission status being "FALSE" in the retrieved transmission management table 314 and stops transmitting the video data corresponding to the transmission status "FALSE" to the relay device 17. Further, the stopper 317 instructs the imaging part 303 to stop capturing images and switch off the power of the camera in response to terminating the transmission of the video data. As a result, the energy consumption of the communication terminal 13 may be lowered. After the power of the camera has been switched off, the process ends in step S1450.

Figure 15:
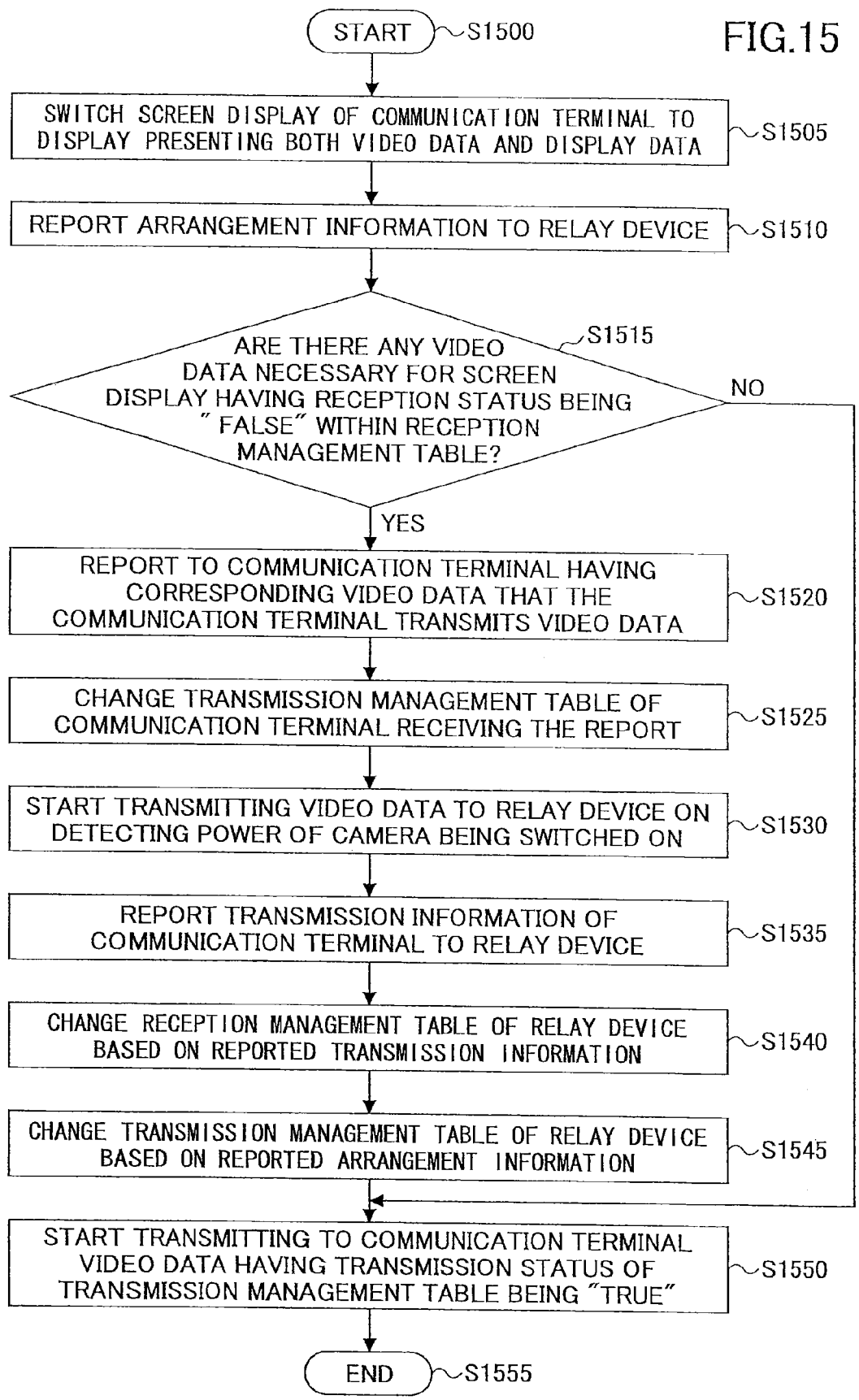
FIG. 15 is a flowchart illustrating a fourth process performed by the teleconferencing system.

FIG. 15 is a flowchart illustrating a process of restarting to supply power to the communication terminal 13 having the power of the camera switched off in the processes illustrated in FIGS. 12 to 14 to start transmitting the video data.

Step S1500 initiates the process. In step S1505, the operational input receiver 301 receives a setting change input from the user of the communication terminal 13. Note that step 1505 differs from step S1405 illustrated in FIG. 14. In step S1505, the image display controller 304 transmits the video data to the display 14 while the display data controller 312 transmits the display data to the display 14 to switch to a screen of the display 14 to display both the video data and the display data.

In step S1510, the reporting part 319 reports to the relay device 17 the arrangement information for displaying both the video data and the display data in response to the switching of the screen of the display 14 to display both the video data and the display data. So far, the process performed by the communication terminal 13 has been illustrated.

In the following, a description is given of a process performed by the relay device 17. In step S1515, the determining part of the relay device 17 determines whether there are any video data having the reception statuses being "FALSE" in the reception management table 405 disposed in the relay device 17 among the video data necessary for the screen display. When there are video data having the reception statuses being "FALSE" in the reception management table 405 disposed in the relay device 17, the determining part of the relay device 17 reports to the corresponding communication terminal(s) and instructs the communication terminal(s) 13 to transmit the video data in step S1520. The reporting to the corresponding communication terminal(s) may be implemented by causing the controller 401 to create a message and causing the transmitting-receiving part 400 to transmit the created message as described above. So far, the process performed by the relay device 17 has been illustrated. By contrast, when there are no video data having the reception statuses being "FALSE" in the reception management table 405 disposed in the relay device 17, step S1550 is subsequently processed.

Steps from step S1525 onward correspond to a process performed by the communication terminal 13 again. In step S1525, the changing part 318 instructs the storing-reading processor 309 to retrieve the transmission management table 314 stored in the storage part 310 in response to the detection of the report, and change the transmission status of the video data from the previous "FALSE" to the current "TRUE". The changing part 318 then instructs the storing-reading processor 309 to store the changed transmission management table 314 in the storage part 310. The display data controller 312 may be able to prompt the user of the communication terminal 13 to switch ON the power of the camera in response to the detection of the report. For example, the display data controller 312 may prompt the user to switch ON the power of the camera by displaying a message such as "Please switch ON the power of the camera".

In step S1530, when the user sees the displayed message and switches the power of the camera ON, the imaging part 303 starts operating to output the video data. When the transmitting-receiving part 300 receives the video data from the imaging part 303, the transmitting-receiving part 300 starts transmitting the video data to the relay device 17. In step S1535, the reporting part 319 reports the transmission management table 314 as the transmission information to the communication terminals 13 used in the same conference, such that the communication terminals 13 used in the same conference display the transmitted video data. So far, the process performed by the communication terminal 13 has been illustrated.

In the following, a description is given of the process performed by the relay device 17 again. In step S1540, the changing part 404 of the relay device 17 receives the above-described report of the transmission information from the communication terminal 13, and changes the reception management table 405 based on that received transmission information. That is, the changing part 404 changes the reception status of the video data that the communication terminal 13 start transmitting from "FALSE" into "TRUE".

Further, in step S1545, the changing part 404 changes the transmission management table 406 of the relay device 17 based on the arrangement information reported in step S1510. That is, the changing part 13 changes the transmission status of the video data used in the screen display of the communication terminal 13 that has transmitted the report from "FALSE" into "TRUE".

Then, in step S1550, the changing part 404 starts transmitting the video data having the transmission status of the transmission management table 406 being changed into "TRUE" to the communication terminal 13 that has transmitted the report. The above video data being transmitted to the communication terminal 13 correspond to the video data received from other communication terminals 13 used in the same conference. After the transmission of the video data has been initiated, the process ends in step S1555.

As described above, the consumption power of the communication terminal 13 may be lowered by terminating transmission of the video data while camera is unused in the communication terminal 13. The reduction in energy consumption of the communication terminal 13 may be advantageous specifically in a case the communication terminal 13 is driven by batteries.

According to the above-described embodiment, the consumption power of the communication terminal may be reduced by terminating capturing images and transmitting the captured image data.

Although a preferred embodiment of the communication terminal has been specifically illustrated, the present invention is not limited to the embodiment described. It is to be understood that other embodiments, additions, alterations, modifications and deletion may be made therein without departing from the spirit and scope of the invention as defined by the claims insofar as those exhibit advantageous functions and effects.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2012-237581 filed on Oct. 29, 2012, the entire contents of which are hereby incorporated by reference.

What is claimed is:

1. A communication terminal transmitting and receiving audio data and at least one of image data obtained by imaging a subject and display data of a shared screen between the communication terminal and one or more other communication terminals via a relay device, the communication terminal comprising:
  circuitry configured to:
    detect a predetermined event in which a transmission of the image data is not required while imaging the subject is continuously executed;
    stop imaging the subject and stop transmitting the image data in response to the detection of the predetermined event;
    change a transmission management table associated with the transmission of the image data in response to the detection of the predetermined event;
    stop supplying electric energy to an imaging device, that is configured to output the image data, after having stopped imaging the subject and stopped transmitting the image data to the relay device; and
    report to the relay device arrangement information used for a screen display in response to switching to the screen display not displaying the image data, and receiving a report indicating that none of the communication terminal and the one or more other communication terminals utilizes the image data transmitted from the communication terminal, wherein
  the transmission management table includes information of a terminal identification, a data name of the image data, and a transmission status, the terminal identification indicating a destination communication terminal to which the image data is transmitted, and
  the predetermined event corresponds to performing the imaging of the subject, and disposing the imaging device within the communication terminal.

2. A teleconferencing system comprising:
  the communication terminal and the one or more other communication terminals as claimed in claim 1; and
  the relay device configured to relay the audio data and at least one of the image data and display data of a shared screen transmitted and received between the communication terminal and the one or more other communication terminals.

3. The communication terminal as claimed in claim 1, wherein the predetermined event further corresponds to covering the imaging device with a protecting member.

4. The communication terminal as claimed in claim 1, wherein the predetermined event further corresponds to starting to transmit and receive the display data between the communication terminal and the one or more other communication terminals after an external input device configured to input the display data into the communication terminal is connected to the communication terminal.

5. The communication terminal as claimed in claim 1, wherein the predetermined event further corresponds to receiving a report indicating that none of the communication terminal and the one or more other communication terminals utilizes the image data transmitted from the communication terminal.

6. The communication terminal as claimed in claim 1, wherein the circuitry is configured to report the changed transmission information to the relay device, in response to the detection of the predetermined event.

7. A non-transitory computer-readable recording medium storing a program, which, when processed by circuitry of a communication terminal, causes the communication terminal to perform a method, the communication terminal being configured to transmit and receive audio data and at least one of image data obtained by imaging a subject and display data of a shared screen between the communication terminal and one or more other communication terminals via a relay device, the method comprising:
  detecting a predetermined event in which a transmission of the image data is not required while imaging the subject is continuously executed;
  stopping imaging the subject and stopping transmitting the image data in response to the detection of the predetermined event;
  changing a transmission management table associated with the transmission of the image data in response to the detection of the predetermined event;

stopping supply of electric energy to an imaging device, that is configured to output the image data, after having stopped imaging the subject and stopped transmitting the image data to the relay device; and reporting to the relay device arrangement information used for a screen display in response to switching to the screen display not displaying the image data, and receiving a report indicating that none of the communication terminal and the one or more other communication terminals utilizes the image data transmitted from the communication terminal, wherein the transmission management table includes information of a terminal identification, a data name of the image data, and a transmission status, the terminal identification indicating a destination communication terminal to which the image data is transmitted, and the predetermined event corresponds to performing the imaging of the subject, and disposing the imaging device within the communication terminal.

8. The non-transitory computer-readable recording medium as claimed in claim 7, wherein the predetermined event further corresponds to covering the imaging device with a protecting member.

9. The non-transitory computer-readable recording medium as claimed in claim 7, wherein the predetermined event further corresponds to starting to transmit and receive the display data between the communication terminal and the one or more other communication terminals after an external input device configured to input the display data into the communication terminal is connected to the communication terminal.

10. The non-transitory computer-readable recording medium as claimed in claim 7, wherein the predetermined event further corresponds to receiving a report indicating that none of the communication terminal and the one or more other communication terminals utilizes the image data transmitted from the communication terminal.

11. A method for a communication terminal, the communication terminal being configured to transmit and receive audio data and at least one of image data obtained by imaging a subject and display data of a shared screen between the communication terminal and one or more other communication terminals via a relay device, the method comprising:

detecting a predetermined event in which a transmission of the image data is not required while imaging the subject is continuously executed;

stopping imaging the subject and stopping transmitting the image data in response to the detection of the predetermined event;

changing a transmission management table associated with the transmission of the image data in response to the detection of the predetermined event;

stopping supply of electric energy to an imaging device, that is configured to output the image data, after having stopped imaging the subject and stopped transmitting the image data to the relay device; and reporting to the relay device arrangement information used for a screen display in response to switching to the screen display not displaying the image data, and receiving a report indicating that none of the communication terminal and the one or more other communication terminals utilizes the image data transmitted from the communication terminal, wherein the transmission management table includes information of a terminal identification, a data name of the image data, and a transmission status, the terminal identification indicating a destination communication terminal to which the image data is transmitted, and the predetermined event corresponds to performing the imaging of the subject, and disposing the imaging device within the communication terminal.

12. The method of claim 11, wherein the predetermined event further corresponds to covering the imaging device with a protecting member.

13. The method of claim 11, wherein the predetermined event further corresponds to starting to transmit and receive the display data between the communication terminal and the one or more other communication terminals after an external input device configured to input the display data into the communication terminal is connected to the communication terminal.

* * * * *